US009055716B2

(12) United States Patent
Roberge

(10) Patent No.: US 9,055,716 B2
(45) Date of Patent: Jun. 16, 2015

(54) CONTINUOUS ROUND BALER CARRIERS

(71) Applicant: Martin J. Roberge, Saskatoon (CA)

(72) Inventor: Martin J. Roberge, Saskatoon (CA)

(73) Assignee: CNH Industrial Canada, LTD., Saskatchewan (CA)

( * ) Notice: Subject to any disclaimer, the term of this patent is extended or adjusted under 35 U.S.C. 154(b) by 0 days.

(21) Appl. No.: 14/249,086

(22) Filed: Apr. 9, 2014

(65) Prior Publication Data
US 2014/0215993 A1  Aug. 7, 2014

Related U.S. Application Data

(63) Continuation of application No. 13/472,266, filed on May 15, 2012, now Pat. No. 8,733,241.

(51) Int. Cl.
*A01D 39/00* (2006.01)
*A01D 43/02* (2006.01)
*A01D 75/00* (2006.01)
*A01F 15/07* (2006.01)
*A01D 43/00* (2006.01)

(52) U.S. Cl.
CPC .......... *A01F 15/0705* (2013.01); *A01D 43/006* (2013.01)

(58) Field of Classification Search
CPC ............ A01F 15/0705; A01F 15/0825; A01F 15/0833; A01F 15/106; A01F 15/07; A01F 15/085; A01F 2015/077; A01F 2015/0795; A01D 43/006; A01D 87/127; A01D 59/00
USPC ............... 56/341, 131; 100/88, 207, 193, 3, 1
See application file for complete search history.

(56) References Cited

U.S. PATENT DOCUMENTS

| 2,833,206 A | 5/1958 | Callum |
| 4,009,559 A | 3/1977 | Mast |
| 4,011,711 A | 3/1977 | Mast |
| 4,022,003 A | 5/1977 | Strausser et al. |
| 4,035,999 A | 7/1977 | Crane et al. |
| 4,045,947 A | 9/1977 | Mast |
| 4,052,841 A | 10/1977 | Rice et al. |
| 4,057,954 A | 11/1977 | Mast |
| 4,062,172 A | 12/1977 | Rice et al. |
| 4,510,861 A | 4/1985 | Campbell et al. |
| 4,517,891 A | 5/1985 | Henry |
| 4,534,285 A | 8/1985 | Underhill |
| 4,580,398 A | 4/1986 | Bruer et al. |
| 4,584,827 A | 4/1986 | Merke et al. |
| 4,597,248 A | 7/1986 | Campbell et al. |

(Continued)

FOREIGN PATENT DOCUMENTS

| DE | 2634638 A1 | 2/1978 |
| DE | 102005020777 | 11/2006 |

(Continued)

*Primary Examiner* — Árpád Fábián-Kovács
(74) *Attorney, Agent, or Firm* — Patrick M. Sheldrake; Seyed V. Sharifi T.

(57) ABSTRACT

A crop harvesting system for continuous round baling is described that comprises a first and second bale chamber and a conveyor system in operable communication with the first and second bale chambers. The crop harvesting system can comprise at least three bale carriers, at least two serpentine systems to facilitate movement of the bale into and out of the first and second bale chambers. The crop harvesting system can be integrated into an agricultural harvester such as a baler or combine.

12 Claims, 10 Drawing Sheets

(56) References Cited

U.S. PATENT DOCUMENTS

| | | |
|---|---|---|
| 4,597,249 A | 7/1986 | Bowden |
| 4,597,254 A | 7/1986 | Bowden |
| 4,625,502 A | 12/1986 | Gerhardt et al. |
| 4,667,592 A | 5/1987 | Pentith et al. |
| 4,815,266 A * | 3/1989 | Ratzlaff et al. ............... 56/341 |
| 4,914,900 A | 4/1990 | Viaud |
| 5,115,734 A | 5/1992 | Quartaert |
| 5,136,831 A * | 8/1992 | Fell et al. ..................... 56/341 |
| 6,295,797 B1 | 10/2001 | Naaktgeboren et al. |
| 6,467,237 B2 | 10/2002 | Viaud |
| 6,644,006 B1 | 11/2003 | Merritt et al. |
| 6,688,092 B2 | 2/2004 | Anstey et al. |
| 6,729,118 B2 | 5/2004 | Viaud |
| 6,877,304 B1 | 4/2005 | Smith et al. |
| 7,640,721 B2 | 1/2010 | Viaud et al. |
| 2002/0184869 A1 * | 12/2002 | Viaud ............................ 56/341 |
| 2010/0267432 A1 | 10/2010 | Roberge et al. |
| 2011/0168038 A1 | 7/2011 | Viaud et al. |
| 2011/0174171 A1 * | 7/2011 | Viaud et al. .................. 100/76 |
| 2014/0165856 A1 * | 6/2014 | Varley ........................... 100/40 |

FOREIGN PATENT DOCUMENTS

| | | |
|---|---|---|
| EP | 0254337 A1 | 1/1988 |
| EP | 2220929 A1 | 8/2010 |
| EP | 1836890 B1 | 11/2010 |
| FR | 2591849 A1 | 6/1987 |
| GB | 2169847 A | 7/1986 |
| WO | 84/02253 A1 | 6/1984 |
| WO | 9908505 A | 2/1999 |

\* cited by examiner

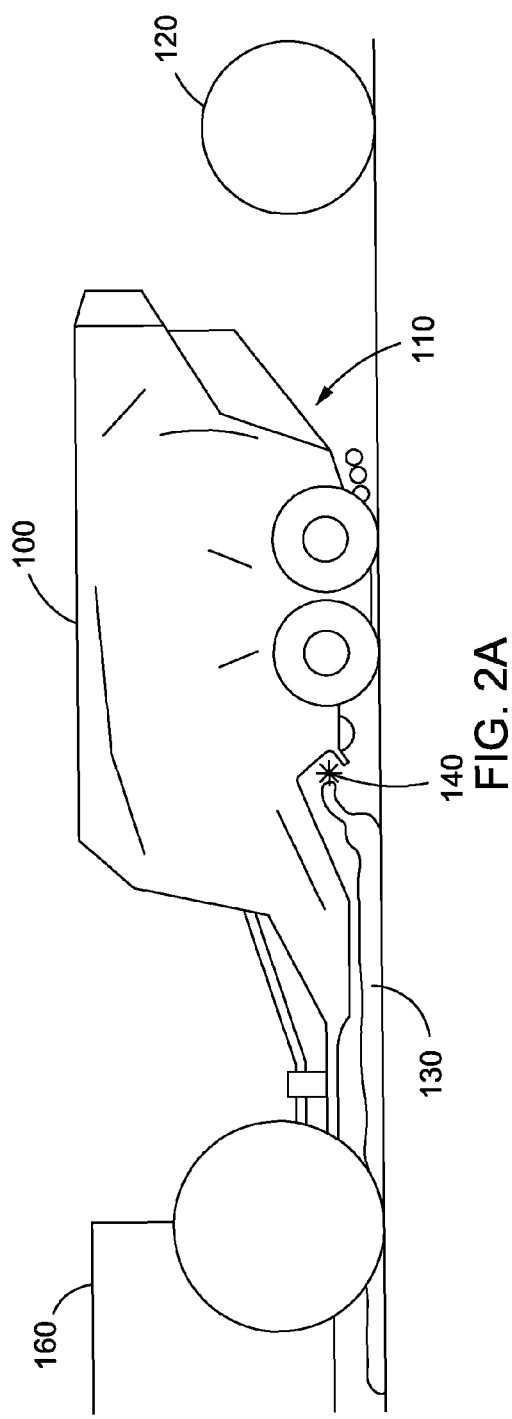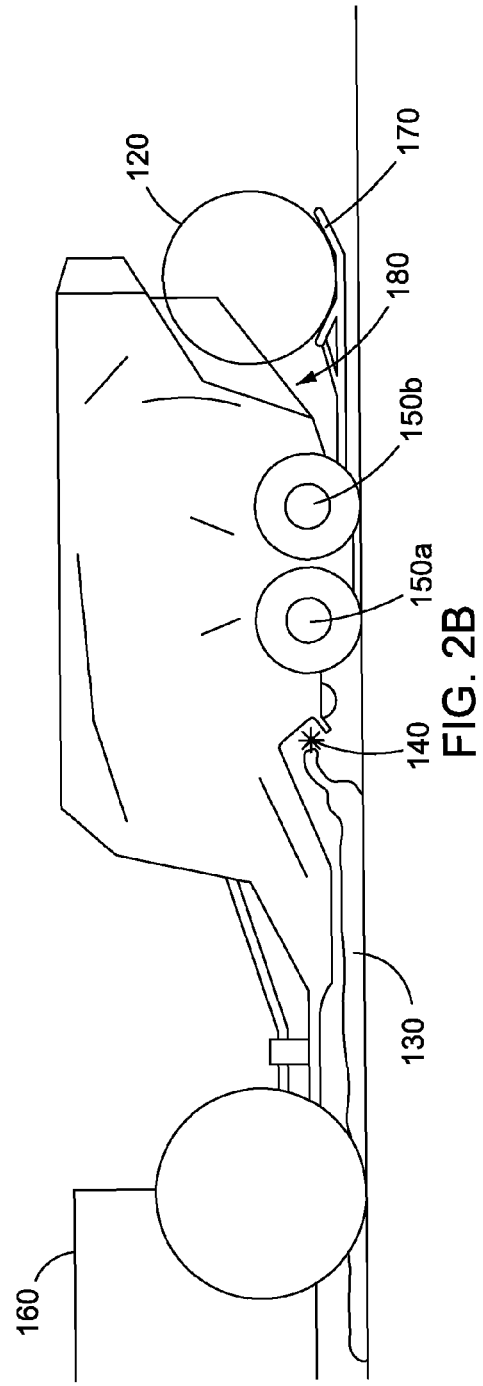

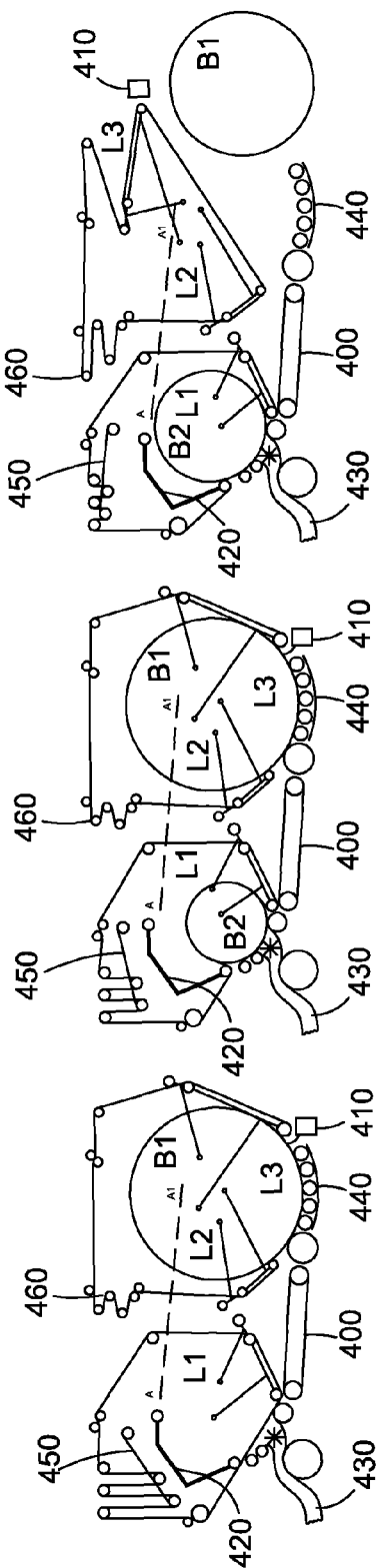
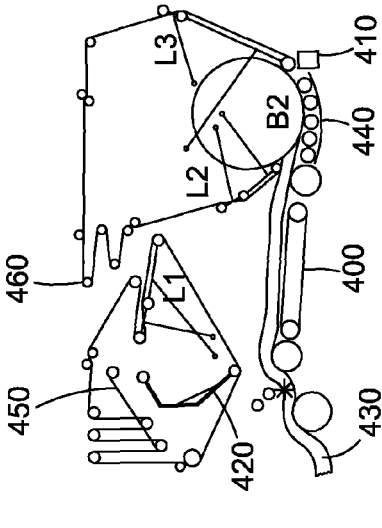
FIG. 4A  FIG. 4B  FIG. 4C  FIG. 4D  FIG. 4E  FIG. 4F

CONTINUOUS ROUND BALER CARRIERS

This divisional application claims priority under 35 U.S.C. §120 from co-pending U.S. patent application Ser. No. 13/472,266 filed on May 15, 2012 by Martin J. Roberge with the same title, the full disclosure of which is hereby incorporated by reference.

TECHNOLOGY FIELD

The present invention relates to an agricultural harvester and a system for the continuous baling of crop. The agricultural harvester and system comprises a crop harvesting assembly, a first and second bale chambers, and a conveyor system that transfers harvested crop from a crop harvesting assembly to one of two bale chambers and that transfers a bale still in formation from a first bale chamber to a second bale chamber. The present invention relates to an agricultural harvester capable of simultaneous harvesting, bale growth, and bale ejection.

BACKGROUND OF THE INVENTION

For many years agricultural balers have been used to consolidate and package crop material so as to facilitate the storage and handling of the crop material for later use. A mower-conditioner typically cuts and conditions the crop material for windrow drying in the sun. When the cut crop material is properly dried, an agricultural harvester, such as a round baler, operates over the windrows to pick up the crop material and form the crop material into cylindrically-shaped round bales. Other agricultural harvesters, such as those harvesters used for biomass collection, use direct feed mechanisms that cut, collect, and bale material into a round bale in sequential steps.

The pickup of the baler gathers the cut and windrowed crop material from the ground then convey the cut crop material into a bale-forming chamber within the baler. A drive mechanism operates to activate the pickup, auger, and a rotor of the feed mechanism. A conventional baling chamber may consist of a pair of opposing sidewalls with a series of belts that rotate and compress the crop material into a cylindrical shape.

When the bale has achieved a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

The tailgate of the baler typically houses a simple door or panel that is affixed to the tailgate by hinges. In one position, the door or panel remains closed to prevent escape of the harvested bale. In another position, the door or panel can be placed in an open position to facilitate the exit of the harvested bale. Conventional balers require a relatively long period of downtime, typically in the range of between 10 and 15 seconds, to open the door or panel during operation and evacuation of the bale. The downtime required to operate the door reduces the overall efficiency of the harvesting system and interrupts continuous harvesting. The simple door or panel mechanism typically operates very slowly in a manual or automatic fashion. Once fully open the weight of the door or panel is typically very heavy, which affects the center of gravity of the equipment, puts additive stress on the tension points, and may cause instability problems if the agricultural harvester is on a hill or slope.

Modified balers have been designed to address delays caused by ejection. EP 2 220 929 discloses a round baler with a bale chamber and a storage chamber. Bales are condensed and wrapped in the bale chamber, and a fully-formed bale may be stored in and eventually ejected from the storage chamber while harvesting continues to take place in the bale chamber. A harvesting assembly centrally located on the bottom of the harvester routes harvested crop to one of the two chambers. The harvesting assembly in conjunction with an internal series of rollers between the two chambers routes harvested crop through a curved passage that back-feeds the bale chamber on a single moveable roller. A limitation of this design is the multiple directions toward which the harvested crop must be fed from the harvesting assembly causing a greater likelihood of clogging the entry point of the bale chamber. The likelihood of clogging the passage with crop also increases with the work of the back-feed mechanism being completed by a single roller. Another problem is the conventional means to eject the bale from the harvester.

U.S. Pat. No. 6,729,118 discloses another modified baler for harvesting in which three movable arms in operable connection to movable rollers. The moveable arms rotate about the same axis in a windmill-like fashion within the interior of the baler. A pick-up assembly directs crop to only one bale chamber entry point and the windmill-like motion of the arms conveys a bale to a second position within the harvester immediately prior to ejection. This design allows for fewer rollers in the interior of the harvester which are necessary to transfer a partially formed bale to a second position while bale formation occurs near the bale chamber entry point. A potential problem with the design is the control of the independent movement of the arms which may increase operator error during operation. Another limitation of the design is the increased likelihood of silage pile-up and plugging of bale chamber due to a lack of sufficient tension around the bale chamber due to a long belt and long belt pathway. This problem is likely exacerbated by the movable roller mechanically linked to a spring at the front end of the baler. Increased silage and harvested crop pile-up toward the front of the baler may contribute to the bale not forming properly while the baler is in operation due to the lack of tension on the bales caused by the movable roller and its related spring-loaded apparatus.

SUMMARY OF THE INVENTION

The present invention relates to an agricultural harvester comprising a pickup assembly and two bale chambers operably coupled by a conveyor system. One bale chamber is positioned in the front of the agricultural harvester while the second bale chamber is positioned in the rear of the agricultural harvester. Depending upon the mode of operation, either bale chamber or both bale chambers may be used for bale formation. The design also allows for continuous bale formation to greatly improve the efficiency of simultaneous crop harvesting, bale formation, and bale ejection. While a bale is fully forming in the rear of the baler in a second bale chamber, the first bale chamber can begin partially forming a second bale, this partially formed second bale being sometimes called a core. In some embodiments, a bale carrier is configured around the outlet of the first bale chamber to allow quick ejection of the bale from the first bale chamber and transfer to the second bale chamber. In some embodiments, two bale carriers are configured around the entry point and outlet, respectively, of the second bale chamber to allow clearance of the bale entering and exiting the second bale chamber. In some embodiments, a first bale chamber may be positioned forward of a second bale chamber, wherein the first and second bale chambers are operably coupled by a conveyor system.

The present invention relates to a continuous round baler comprising: a first bale chamber and a second bale chamber operably coupled by a conveyor system; wherein the first bale chamber is positioned at a front of the baler and the second bale chamber is positioned at a rear of the baler, wherein each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls; wherein the conveyor system is positioned between the first and second bale chambers at a downward angle from the front of the baler to the rear of the baler;
  a crop harvesting arrangement positioned in front of the baler and operably connected to the first bale chamber;
  a first serpentine system arranged for the first bale chamber, the first serpentine system comprising:
    a first bale carrier positioned at the outlet of the first bale chamber; and
    a plurality of baling belt rollers in operable contact with one or more baling belts, the plurality of baling belt rollers comprising two lower baling belt rollers movable in an up and downward direction independent of movement of any other baling belt rollers in the baler;
  a second serpentine system arranged for the second bale chamber, the second serpentine system comprising:
    a second bale carrier positioned at the entry point of the second bale chamber;
    a third bale carrier positioned at the outlet of the second bale chamber; and
    a plurality of baling belt rollers in operable contact with one or more baling belts, the plurality of baling belt rollers comprising two belt rollers movable in the fore and aft directions and independent of movement of any other rollers in the baler; wherein the second and third bale carriers are in operable contact with the one or more baling belts.

The downward angle of the conveyor system allows for bale transfer between the first and second bale chambers to be achieved more easily by movement of the conveyor system combined with the downward force of gravity.

In some embodiments, the present invention relates to a continuous round baler comprising: a first bale chamber and a second bale chamber operably coupled by a conveyor system; wherein the first bale chamber is positioned at a front of the baler and the second bale chamber is positioned at a rear of the baler, wherein each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls; wherein the conveyor system is positioned between the first and second bale chambers at a downward angle from the front of the baler to the rear of the baler;
  a crop harvesting arrangement positioned in front of the baler and operably connected to the first bale chamber;
  a first serpentine system arranged for the first bale chamber, the first serpentine system comprising:
    a first bale carrier positioned at the outlet of the first bale chamber; and
    a plurality of baling belt rollers in operable contact with one or more baling belts, the plurality of baling belt rollers comprising two lower baling belt rollers movable in an up and downward direction independent of movement of any other baling belt rollers in the baler;
  a second serpentine system arranged for the second bale chamber, the second serpentine system comprising:
    a second bale carrier positioned at the entry point of the second bale chamber;
    a third bale carrier positioned at the outlet of the second bale chamber; and
    a plurality of baling belt rollers in operable contact with one or more baling belts, the plurality of baling belt rollers comprising two belt rollers movable in the fore and aft directions and independent of movement of any other rollers in the baler; wherein the second and third bale carriers are in operable contact with the one or more baling belts; and wherein each of the first, second, and third bale carriers are movable in the upward and downward directions by a mechanical device operatively coupled to the first pair of arms and/or the second pair of arms of each of the first, second, and third bale carriers; and wherein the second bale carrier forms a front side of a bale in the second bale chamber in its fully closed position, wraps the fully formed bale while in transition to its closed position and receives a partially formed bales from the first bale chamber in an open position; and wherein the third bale forms a rear side of the bale in the second bale chamber in its fully closed position and facilitates evacuation of the bale in an open position.

In some embodiments, the first serpentine system comprises a first series of baling belt rollers, a second series of baling belt rollers, and a third series of baling belt rollers; wherein the first series of baling belt rollers comprises at least two baling belt rollers positioned above the first bale chamber within a plane transverse to the middle region of first bale chamber; wherein the second series of baling belt rollers comprises at least three upper baling belt rollers positioned upward and frontward from the center of the first bale chamber and each aligned at the same height along the top of the baler and the two lower baling belt rollers positioned at their highest position below the three upper baling belt rollers; and wherein the third series of baling belt rollers comprises at least two baling belt rollers positioned frontward of the first bale chamber and at a height above the floor roller and under the first series and second series of baling belt rollers; and wherein the second serpentine system comprises a fourth series and a fifth series of baling belt rollers, the fourth series of baling belt rollers positioned above the second bale chamber within a plane transverse to the second bale chamber's approximate center; and the fifth series of baling belt rollers comprising the three fixed baling belt rollers aligned vertically and frontward from the second bale chamber and the two baling belt rollers movable in the fore and aft directions.

In some embodiments, the first, second, and third bale carriers are movable among a closed position and one or more open positions, each bale carrier comprising: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance defined by the length of the first and second pair of arms; and a pair of parallel bars affixed to the one or more fixed members.

In some embodiments, the plurality of baling belt rollers comprises two lower baling belt rollers fixed at each end to a pair of parallel movable members, the two lower baling belt rollers movable in an upward and downward direction about a pivot point determined by the rearward end of the pair of parallel members and independent of movement of any other rollers in the baler.

In some embodiments, the conveyor system, which facilitates movement of a bale (or bale core) between the first and second bale chambers and is positioned at a downward angle between the first and second bale chambers, comprises at least two rollers and a conveyor belt positioned over the at least two rollers wherein rotation of the at least two rollers causes the conveyor belt to carry harvested crop from the crop harvesting arrangement to the second bale chamber. In some embodiments, the conveyor system comprises at least three, four, or more rollers positioned at a downward angle between the first and second bale chambers. In some embodiments, the conveyor system comprises one or more conveyor belts that carry harvested crop from the crop harvesting arrangement or first bale chamber to the second bale chamber.

In some embodiments, the first and second bale chambers are defined in a space between the first sidewall, the second sidewall, the bale carrier, and a plurality of rollers positioned between and attached to the first and second sidewalls; wherein the plurality of rollers support one or more baling belts and comprise at least one floor roller.

In some embodiments, the baler comprises a first sensor positioned in the first bale chamber and a second sensor positioned in the second bale chamber, wherein the first and second sensors are in operable communication with a controller system and detect the diameter of a bale in the first and second bale chambers.

In some embodiments, the baler of the present invention further comprises at least a first and second operable condition, wherein the first operable condition comprises the first bale carrier in a fully closed position, the second bale carrier in a fully close position, and the third bale carrier in a fully raised position, wherein the fully raised position of the third bale carrier allows evacuation of a bale from the baler; the second operable condition comprises the first bale carrier and the second bale carrier in a fully raised position, and the third bale carrier in a fully closed position, wherein the first and second fully raised positions allows for transfer of a bale from the first bale chamber to the second bale chamber; wherein the first baler carrier in a fully raised position allows for crop to be transferred from a crop harvesting assembly through the first bale chamber and into the second bale chamber where the crop accumulates into a bale of a predetermined size.

In some embodiments, the baler of the present invention further comprises a motor and at least one of the following: an electronic actuator, a hydraulic cylinder, or a tensioning actuator operatively coupled to the first pair of arms and/or the second pair of arms at least one bale carrier, wherein the at least one electronic actuator, a hydraulic cylinder, or a tensioning actuator facilitate the upward or downward movement of the at least one bale carrier.

In some embodiments, the baler comprises a net wrapping mechanism in the second bale chamber optionally positioned under the third bale carrier to the rear of the second bale chamber or above the second bale carrier in the front of the second bale chamber. In some embodiments, the baler comprises a net wrapping mechanism in the second bale chamber optionally positioned under the third bale carrier to the rear of the second bale chamber, above the second bale carrier in the front of the second bale chamber, or affixed to the second bale carrier; wherein, if the net wrapping mechanism is above the second bale carrier or under the third bale carrier to the rear of the second bale chamber, the net wrapping mechanism is independently controlled and operated by one or more controllers. In some embodiments, the net wrap system can also be attached to the front of second bale carrier.

In some embodiments, the second bale chamber comprises at least one floor roller movable in the upward or aft direction that functions as a bale kicker when the third bale carrier is raised in a fully open position, wherein the at least one floor roller is in operable communication to a controller system.

In some embodiments, the conveyor system comprises at least four rollers around which one or more conveyor belts rotate, wherein the rollers exact tension on the conveyor belt and convey crop between the first and the second bale chambers.

In some embodiments, the invention relates to a crop collection system for use in an agricultural harvester comprising: a first bale chamber and a second bale chamber operably coupled by a conveyor system; wherein the first bale chamber is positioned at a front of the baler and the second bale chamber is positioned at a rear of the baler, wherein each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls; wherein the conveyor system is positioned between the first and second bale chambers at a downward angle from the front of the baler to the rear of the baler; a crop harvesting arrangement positioned in the front of the baler and in operable connection to the first bale chamber; and at least one bale carrier, each bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance defined by the length of the first and second pair of arms; and a pair of parallel bars affixed to the one or more fixed members.

In some embodiments, the invention relates to a crop collection system for use in an agricultural harvester, such as a round baler, comprising: a first bale chamber and a second bale chamber operably coupled by a conveyor system; wherein the first bale chamber is positioned at a front of the baler and the second bale chamber is positioned at a rear of the baler, wherein each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls; wherein the conveyor system is positioned between the first and second bale chambers at a downward angle from the front of the baler to the rear of the baler; a crop harvesting arrangement positioned in the front of the baler and in operable connection to the first bale chamber; and at least one bale carrier, each bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance defined by the length of the first and second pair of arms; and a pair of parallel bars affixed to the one or more fixed members; wherein the second bale chamber comprises at least one floor roller attached to a spring that assert move force to the bale when the bale is ejected from the second bale chamber. In some embodiment, the crop collection system comprises a second bale chamber with two or more, three or more, or four or more floor rollers. In some embodiments, each of the two or more, three or more, or four or more floor rollers are in operable connection to at least one spring, wherein each roller exerts a force on the bale exiting the second bale chamber to increase the speed of the bale as it exists the second bale chamber. In some embodiments the spring on the at least one floor roller is compressed and released in coordination with a hydraulic cylinder and actuator in operably linked to the second bale carrier so that extension of the hydraulic cylinder occurs contemporaneously with the sequential compression and release of the spring or springs. The at least one floor roller, at least two floor rollers, at least three floor rollers act as bale kickers to facilitate the ejection of the bale from the second bale chamber upon upward movement of the second bale carrier from its fully closed position.

In some embodiments, the crop collection system further comprises a fixed member positioned above the at least one bale carrier for feeding or retracting a flexible material attached along a face of the at least one bale carrier distal to the fixed member. In some embodiments, the fixed member comprises a spring-loaded roller for feeding or retracting the flexible material. In some embodiments the flexible material is used for a safety barrier between the third bale carrier and the area outside the agricultural harvester comprising the bale forming or ejection system or the baler. In some embodiments, the fixed member is operably coupled to at least one motor for facilitating the feeding or retraction of the flexible material. In some embodiments of the invention, the flexible material is a tarp, woven textile, synthetic fiber, or rubber flap which provides a physical barrier between the operating bale chambers and the environment rear to the crop collection system. The physical barrier prevents harvested crop or other materials in the second bale chamber from being ejected out of the crop collection system and prevents individuals or other objects from entering the second bale chamber.

In some embodiments, the agricultural harvester is one of: a round baler, a cotton harvester, a waste baler, and a combine.

In some embodiments the one or more fixed members of the at least one bale carrier comprise at least a first roller; wherein the pair of parallel bars are affixed to each end of the first roller on a set of rotatable axes. In some embodiments, the one or more fixed members of the at least one bale carrier comprises at least a first roller and a second roller; wherein the pair of parallel bars are affixed to each end of the first roller and the second rollers on a set of rotatable axes. In some embodiments, the first pair of arms and/or the second pair of arms of the at least one bale carrier is operably coupled to a hydraulic system for facilitating upward movement of the first pair of arms and/or the second pair of arms around the first and second pair of pivot points. In some embodiments, the first pair of arms and/or the second pair of arms of the at least one bale carrier is operably coupled to an electronic system for facilitating upward movement of the first pair of arms and/or the second pair of arms around the first and second pair of pivot points. In some embodiments the one or more fixed members of the at least one bale carrier comprise at least a first roller, a second roller, a third roller; wherein the pair of parallel bars is affixed to each end of the first roller, the second roller, and the third roller on a set of rotatable axes; and wherein the at least one bale carrier comprises a fourth roller positioned transverse to the first and second side walls and above the first roller and proximate to the top of the first and second sidewalls. In some embodiments, the fourth roller establishes enough tension in the baling belts to assure that the baling belts do not physically contact one another in upon upward movement of the first, second, or third bale carriers from their respective fully closed positions or in their respective fully opened positions.

In some embodiments, the crop collection system further comprises: one or more baling belts to convey rotation of a bale in the bale chamber in contact with the fourth roller positioned above of the first, second or third rollers of at least one bale carrier, wherein the fourth roller imparts tension to the one or more baling belts; wherein the first roller of the at least one bale carrier takes up slack in the one or more baling belts when the at least one bale carrier pivots upward at any angle from its closed position and provides slack in the one or more baling belts when the at least one bale carrier pivots downward from an open position; wherein the second roller of the at least one bale carrier deflects contact between the bale and the one or more baling belts; and wherein the third roller of the at least one bale carrier conveys tension to the one or more baling belts whereby it positions the one or more baling belts in operable contact with the bale when the at least one bale carrier is in its closed position.

In some embodiments, the crop collection system comprises three bale carriers, each bale carrier comprising: one or more baling belts to convey rotation of a bale in the bale chamber in contact with a roller positioned above the at least one bale carrier that imparts tension to the one or more baling belts; wherein the first roller of the at least one bale carrier takes up slack in the one or more baling belts when the retractable bale carrier pivots upward at any angle from its closed position and provides slack in the one or more baling belts when the at least one bale carrier pivots downward from an open position; wherein the second roller of the at least one bale carrier deflects contact between the bale and the one or more baling belts; and wherein the third roller of the at least one bale carrier conveys tension to the one or more baling belts whereby it positions the one or more baling belts in operable contact with the bale when the at least one bale carrier is in its closed position.

In some embodiments the present invention relates to a method of harvesting crop into a crop collection system, said method comprising: (a) feeding crop from a crop harvesting assembly into the first bale chamber; (b) forming a partially formed bale in the first bale chamber to a desired size and/or density; (c) transferring the partially formed bale from the first bale chamber to the second bale chamber on the conveyor system; (d) completing bale formation in the second bale chamber; and (e) ejecting the completed bale from the second bale chamber contemporaneously with initiating a new cycle of steps (a) through (d).

BRIEF DESCRIPTION OF THE DRAWINGS

FIGS. 2A and 2B depict two exemplary embodiments of the continuous round baler.

FIG. 4A-4F depict the continuous round baler in various stages of operation.

DETAILED DESCRIPTION OF THE INVENTION

Figure 1:
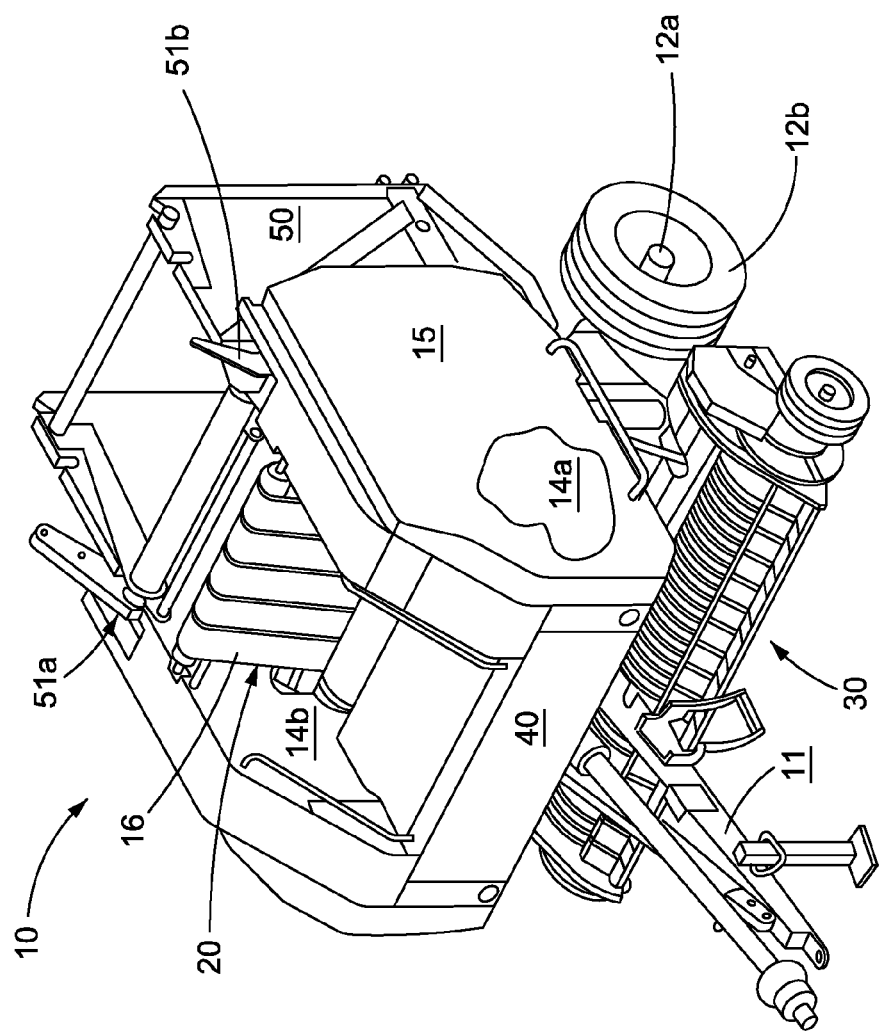
FIG. 1 depicts a static image of a traditional baler.

Various terms relating to the methods and other aspects of the present invention are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "bale chamber" as used herein is defined as any space within the agricultural harvester that forms a bale of harvested crop. In some embodiments, the sides of the bale chamber are defined by opposite side walls and the bottom of the bale chamber is defined by at least one floor roller that spans transverse to the sidewalls and that partially supports the weight of the bale in the bale chamber. In some embodiments, the bale chamber is also defined in its front region by an entry point through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale.

The term "bale carrier" is defined as a retractable mechanism that obstructs an entry or outlet of a bale chamber when the bale carrier is in its fully closed position. In some embodiments, the bale carrier is controlled by an operator, who through a controller, uncovers the entry or outlet points of the bale chamber when the bale is of a desired width, height and/or density. Bale carriers are described in U.S. patent application Ser. No. 13/308,304, currently pending, which is incorporated herein by reference in its entirety. Controllers are generally known in the art and any controller for the agricultural harvester can be used independent of or in conjunction with a tractor controller. Examples of controllers are described in U.S. Pat. No. 7,640,721, which is incorporated herein by reference in its entirety. In some embodiments, the bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance defined by the length of the first and second pair of arms; and a pair of parallel affixed to the one or more fixed members; wherein the bale carrier uncovers the outlet at one end of the bale chamber through which the bale becomes ejected from the bale chamber when the bale carrier is raised upward from its closed position. In some embodiments, at least one bale carrier comprises a fourth roller contained within at least a first or second serpentine system and positioned above the first, second, and third rollers, wherein the fourth roller imparts tension in one or more baling belts when the at least one bale carrier is in its fully closed position. It is understood that a first or second serpentine system comprises the bale carrier and the rollers that are contained within each bale carrier.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entirety. Embodiments of the present invention are particularly well suited, but in no way limited to, use with agricultural balers. The present invention may also find utility in agricultural harvesters including, for example, a waste baler, a cotton harvester, or a combine.

The present invention relates to an agricultural harvester that comprises at least a first, second, and third bale carrier, each bale carrier movable among a closed position and one or more open positions, each bale carrier comprising: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance defined by the length of the first and second pair of arms; and a pair of parallel bars affixed to the one or more fixed members, wherein the one or more fixed members comprise at least a first roller, a second roller, and a third roller; wherein the pair of parallel bars is affixed to each end of the first roller, the second roller, and the third roller on a set of rotatable axes. In some embodiments, the third roller of the at least one bale carrier partially supports the weight of the bale in the bale chamber and facilitates rotation of the bale. In some embodiments, the third bale carrier further comprises a plate that defines an outward (backward) face of the third bale carrier. In some embodiments, the thin plate is riveted to the pair of parallel bars on the third bale carrier and covers the baling belts to conceal the baling belts during operation and provide a physical barrier between the baling belts and the outside environment.

The present invention relates to a continuous round baler comprising: a first bale chamber and a second bale chamber operably coupled by a conveyor system; wherein the first bale chamber is positioned at a front of the baler and the second bale chamber is positioned at a rear of the baler, wherein each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls; wherein the conveyor system is positioned between the first and second bale chambers at a downward angle from the front of the baler to the rear of the baler; wherein the conveyor is positioned to allow gravity-assisted transfer of the bale from the first bale chamber to the second bale chamber.

Referring to FIG. 1, a generally well-known round baler 10 is shown to include a main frame terminating forwardly in a tongue 11 and rearward slightly beyond a transverse axle 12*a* to which a pair of wheels 12*b* (only one shown) is mounted, thus forming a wheel supported main frame (not shown in detail). The main frame supports a series of belts 16 and floor rolls (not shown), which together with a first sidewall 14*a* (shown in the breakout) behind and generally parallel to cover panel 15 and a second sidewall 14*b*, collectively forming a bale-forming chamber 20. Cut crop material is picked up by transverse pickup 30 and fed into bale-forming chamber 20 where it is formed into a cylindrically shaped ball (not shown) by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51*a*, 51*b* and the bale is discharged onto the ground. For clarity and purposes of the instant invention, the tailgate 50 and hydraulic mechanism that controls the upward swing of the tailgate are replaced by the crop collection system (also referred to as a bale collection and ejection system) comprising the serpentine system depicted in FIGS. 3-5, wherein at least one bale carrier comprises or are in operable contact with two hydraulic tensioning actuators on opposite sides of the sidewalls. In some embodiments of the present invention, a pair of hydraulic tensioning actuators are positioned between the outside of the sidewalls and under the main frame of the baler. In some embodiments, the tensioning actuators are electrically powered and are positioned on opposite sides of the sidewalls. In some embodiments of the present invention, tensioning actuators are positioned on the outside of the sidewalls and attached to the main frame of the baler. In some embodiments, the tensioning actuators are electrically powered and on opposite sides of the sidewalls.

FIGS. 2A and 2B depict exemplary side external perspectives of embodiments of the claimed invention, each embodiment depicting a continuous round baler with a mainframe being towed by a tractor 160. Cut crop material 130 is picked up by the transverse pickup 140 positioned forward from two axles (not pictured) that support the wheels 150*a*, 150*b* of the baler. FIG. 2A depicts a cylindrically shaped bale 120, which is formed within in the two bale chambers (not shown), and optionally wrapped in net wrapping or twine deposited from a device in operable contact with the second bale chamber. The cylindrically shaped bale 120 is ejected without a bale ramp through a bale chamber outlet 110 positioned at the rear of the baler 100. The bale 120 rests directly on the ground after ejection. FIG. 2B depicts a similarly shaped bale 120 being ejected from the bale chamber outlet positioned at the rear of the continuous round baler 180 onto a bale ramp 170.

In some embodiments, the bale ramp 170 provides balance to the continuous round baler so that ejection of the bale can be accomplished on a hill or field with a slight incline. In some embodiments, the continuous round baler does not comprise a tailgate that operates on a single hinge. In some embodiments, the continuous round baler does not comprise a bale ramp. In some embodiments, at least a first set of two hydraulic or electronic tensioning actuators positioned on the outside of the opposite sidewalls (and under the mainframe) raise and lower a first bale carrier positioned over the outlet of the first bale chamber. In some embodiments, a second set of two hydraulic or electronic tensioning actuators positioned on the outside of the opposite sidewalls (and under the mainframe) raise and lower a second bale carrier positioned over the inlet of the second bale chamber. In some embodiments, a third set of two hydraulic or electronic tensioning actuators positioned on the outside of the opposite sidewalls and under the mainframe raise and lower a third bale carrier positioned over the outlet of the second bale chamber. In some embodiments, at least a first set of two hydraulic or electronic tensioning actuators positioned on the side of the opposite sidewalls and under the mainframe raise and lower a first, second, and/or third bale carrier positioned over the inlet or outlet of the first or second bale chamber.

Figure 3A:
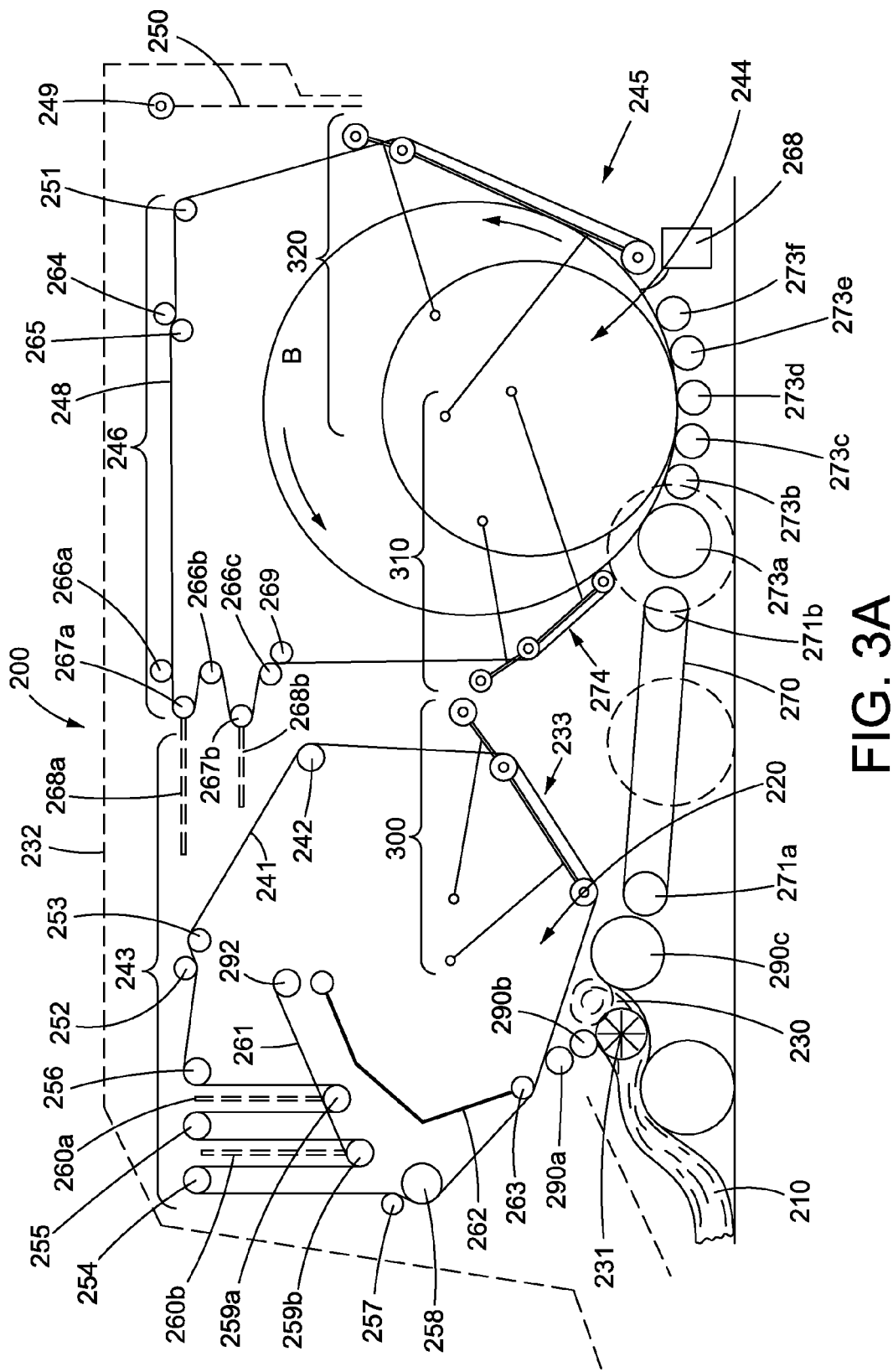
FIGS. 3A and 3B depict an exemplary embodiment of the continuous round baler with two bale chambers, a crop harvesting assembly, and three bale carriers contained within two serpentine systems. Each serpentine system is associated with their respective bale chambers.
Figure 3B:
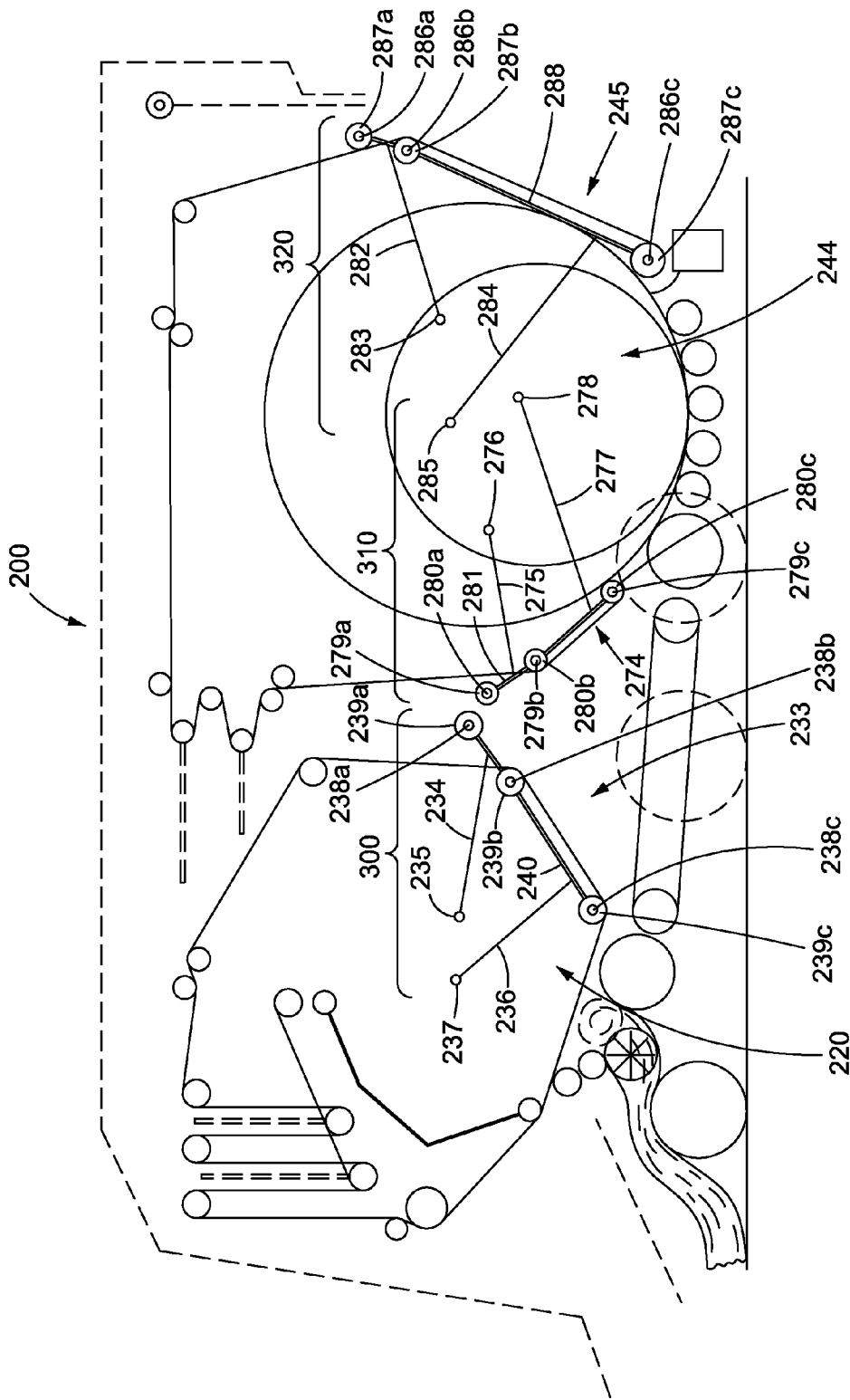

FIGS. 3A and 3B depict an exemplary cross-sectional side view of a continuous round baler generally designated 200 comprising a first bale carrier 300, second bale carrier 310, and a third bale carrier 320, each engaged in a fully closed position. The first bale carrier 300 obstructs the outlet 233 of the first bale chamber 220 in its fully closed position. The second bale carrier 310 obstructs the inlet 274 of the second bale chamber 244 in its fully closed position. In some embodiments, the second bale carrier comprises a plate affixed to its exterior on its frontward face that obstructs movement of silage or crop from entering the second bale chamber 244. The third bale carrier 320 obstructs the outlet 245 of the second bale chamber 244 in its fully closed position. In some embodiments, the third bale carrier comprises a plate affixed to its exterior (on its rearward face) that obstructs movement of silage or crop from exiting the second bale chamber 244. Crop in the field is usually arranged in a windrow as it is engaged by the baler being pulled along the windrow by a tractor (not shown). Crop 210 is conveyed into a first bale chamber 220 through an inlet point 230 fed by the transverse pickup 231 (or, optionally, a rotary cutter) and rolled into a cylindrical shape, (not shown in first bale chamber, although bale B is depicted and described below as cross-section B). In the illustrated embodiment, the bale may rotate between a first sidewall and second sidewall (not shown) such that the top material moves frontward and downward, with respect to the baler 200, (counter-clockwise as shown in the figure), in the first bale chamber 220. Floor rolls 290*a*, 290*b*, and 290*c*, rotate in the opposite direction (here clockwise) defining the front and downward region of the first bale chamber 220. A movable member 262 is in operable contact with a movable roller 263, which, in tandem, form a bale-kicking mechanism capable of moving the movable roller 263 laterally in the aft direction when a bale is ready to be transferred from the first bale chamber 220 to the second bale chamber 244. In some embodiments, the movable member 262 is in operable connection to a tensioning actuator, hydraulic cylinder, or electrically powered actuator. In some embodiments, the movable member 262 is in operable connection to a tensioning actuator, hydraulic cylinder, or electrically powered actuator that is either independently controlled by a controller or triggered to move upon opening of the first bale carrier 300. The baler 200 comprises an outlet at the rear end of the first bale chamber 233, and a first bale carrier 300. A first serpentine system 243 arranged substantially above the first bale chamber 220 comprises one or a plurality of baling belts 241 that extend downward from a stationary or fixed, fourth roller 242 of the bale carrier 300 positioned above the bale chamber 220.

In a fully closed position such as depicted in FIG. 3A, a sufficient amount of tension is created in the first serpentine system 243, so that the baling belts 241 and bale carrier obstruct the outlet 233. In the depicted embodiment of FIG. 3A, the first serpentine system 243 comprises a first series of baling belt rollers, also referred to as a top driving roll assembly, which, in this embodiment, consist of two baling belt rollers 252, 253 positioned above the first bale chamber within a plane transverse to the middle region of first bale chamber (which could be considered as the top drive assembly of the front chamber). In some embodiments, the two baling belt rollers 252, 253 positioned above the first bale chamber within a plane transverse to the middle region of first bale chamber is the top drive assembly of the first bale chamber. A second series of baling belt rollers consists of three stationary upper baling belt rollers 254, 255, 256 positioned upward and frontward from the center of the first bale chamber and, in this embodiment, each aligned at the same height along the top of the baler. Two movable baling belt rollers 259a, 259b positioned in a lowermost position but underneath the three stationary upper baling belt rollers 254, 255, 256 are fixed at each end to a pair of parallel movable members 261 (only one member shown) which are movable in an upward and downward direction about a pivot point 292 determined by the rearward end of the pair of parallel members 261. The movement of the parallel movable members 261 and the movement two lower baling belt rollers 259a, 259b is independent of movement of any other rollers in the baler 200. As depicted in FIG. 3A, the two lower baling belt rollers 259a, 259b are positioned at their lowest position without a bale in the first bale chamber 220. During operation and, as the bale grows in the first bale chamber, the two lower baling belt rollers 259a, 259b move upward in two slots 260a, 260b until a sufficient amount of slack in the baling belts is reduced by the bale growing in the first bale chamber 220. In some embodiments, the two slots 260a, 260b can we slightly arced or curved to accommodate the movement of the pair of parallel members 261. The first serpentine system 243 also comprises a third series of rollers that consist of two baling belt rollers 257, 258 positioned frontward of the first bale chamber 220 and at a height above the floor rolls 290a, 290b, and 290c. The two most forwardly positioned baling belt rollers 257, 258 can also be identified as the front driving roll assembly. With the first bale carrier 300 in a fully closed position, such as depicted in FIG. 3A, a sufficient amount of tension is created in the baling belts 241 of the first serpentine system 243 such that the baling belts 241 in operable contact with the first bale carrier 300 obstruct the outlet 233 of the first bale chamber 220. In some embodiments, it should be noted that the first serpentine system comprises a top drive assembly. In some embodiments, the movable members 259a, 259b engage in coordinated movement with at least a first, second, and/or third bale carrier. In some embodiments, the movable members 259a, 259b engage in coordinated movement with at least a first, second, and/or third bale carrier and the movable rollers 267a, 267b.

The second serpentine system 246 of FIG. 3A depicts the second and third bale carriers 310, 320 in their fully closed positions, which allows for efficient rotation and formation of the rolling bale B. When the bale B is of a sufficient size for ejection, a net wrapping device 268 (in this embodiment positioned under the third bale carrier 320) releases a net wrapping sufficient to cover the bale. The second bale chamber 244 is defined on its bottom by floor rollers 273a, 273b, 273c, 273d, 273e, 273f which rest on a sledge (not depicted) movable in the fore or aft positions. The first bale chamber 220 and the second bale chamber 244 are in operable connection by a conveyor belt 270 wrapped around two conveyor belt rollers 271a, 271b in the central region of the baler 200. The conveyor belt rollers rotate clockwise at a fixed position and shuttle harvested crop to the second bale chamber 244. The conveyor belt rollers provide an infrastructure for the conveyor belt to act like a ramp for bale transfer due to their slightly askew horizontal alignment.

A pair of side frames 232 (only one side frame is depicted in the FIG. 3A and FIG. 3B) encases a pair of oppositely positioned sidewalls (not shown) that define the side of first bale chamber 220. In some embodiments, the sidewalls contain slots positioned to allow movement of the movable rollers disclosed in this application. In some embodiments, the slot of the oppositely positioned sidewalls are positioned vertically with respect to rollers that move in the upward and downward directions. In some embodiments, the slot of the oppositely positioned sidewalls are positioned horizontally with respect to rollers that move in the upward and downward directions. The side frames extend past the first bale carrier 300 of the baler 200 and slightly rearward of the second bale chamber 244 and over the outlet of the second bale chamber 245. A stationary bar 249 affixed between the pair of side frames 232 is attached to one edge of a flexible material 250 such as a tarp, textile, rubber or combination thereof, and extends downward from the stationary bar 249 positioned above the second bale chamber 244 and the third bale carrier 320. In some embodiments, the flexible material 250 functions as a guard for blocking loose silage or debris from ejecting from the agricultural harvester.

FIG. 3A depicts a second serpentine system 246 arranged substantially above the second bale chamber 244 comprising one or a plurality of baling belts 248 extending downward from a fixed roller 251 positioned above the second bale chamber 244.

Similar to the first serpentine system 243, the second serpentine system 246 comprises a first series of baling belt rollers consisting of two baling belt rollers 264, 265 positioned substantially above the middle region of the second bale chamber 244. In some embodiments, the first series of baling belt rollers consisting of two baling belt rollers 264, 265 serves as a top drive assembly. The second serpentine system 246 also comprises a second series of baling belt rollers consisting of three stationary and vertically aligned baling belt rollers 266a, 266b, 266c, and two movable baling belt rollers 267a, 267b positioned forward from the three stationary and vertically aligned baling belt rollers 266a, 266b, 266c. The movable baling belt rollers 267a, 267b are movable in the fore and aft directions through operable contact with two pair of slots 268a, 268b (one slot of each pair depicted) that are embedded within the sidewall (not shown) and follow the length of the baler 200 in the fore direction, forward of the second bale chamber 244. The second series of baling belt rollers in the second serpentine system 246 also comprise a single roller, or front driving roller 269 that exacts tension on the baling belts while the two movable baling belt rollers 267a, 267b are in motion within the two pair of slots 268a, 268b. In this embodiment, the front driving roller 269 and vertically aligned baling belt roller 266c make up the front driving roll assembly. The two movable baling belt rollers 267a, 267b are depicted in their aftmost position relative to the orientation of the baler 200. In some embodiments, the movement of the two movable baling belt rollers 267a, 267b in the fore and aft directions is independent of movement of any other rollers in the baler 200.

FIG. 3B depicts a detailed illustration of the exemplary embodiment of FIG. 3A in which components of a first, second, and third bale carriers 300, 310, 320 are identified. The first bale carrier covers the outlet 233 of a first bale chamber 220. The first bale carrier 300 comprises: at least a first pair of arms 234 extending in parallel transversely from and affixed to a first pair of pivot points 235 on the first and second sidewalls (only one arm and one pivot point of the pair is depicted in side view); and a second pair of arms 236 extending in parallel transversely from and affixed to a second pair of pivot points 237 on the first and second sidewalls (only one arm and one pivot point of the pair is depicted in side view). In the depicted embodiment of the invention, the bale carrier also comprises three fixed members 238a, 238b, 238c around which three elongate rollers 239a, 239b, and 239c independently rotate around three rotatable axes, the three rollers being affixed to a pair of parallel bars 240 (only one parallel bar is depicted in side view). In some embodiments, each of the first pair of arms is shorter in length than the each of the second pair of arms of the first, second, and third bale carriers. First, the second bale carrier 310 covers the inlet 274 of the second bale chamber 244 while bale B is being formed. A plate (not shown) is covering the front of the second bale carrier 319 so the crop does not touch the belts (moving upward) while feeding the second bale chamber 244 at the inlet 274. The second bale carrier comprises at least a first pair of arms 275 extending in parallel transversely from and affixed to a first pair of pivot points 276 on the first and second sidewalls (only one arm and one pivot point of the pair is depicted in side view); and a second pair of arms 277 extending in parallel transversely from and affixed to a second pair of pivot points 278 on the first and second sidewalls (only one arm and one pivot point of the pair is depicted in side view). In some embodiments, the second pair of arms of the second bale carrier are telescopic and are attached to a longitudinal spring to accommodate the growing size of the bale and to maintain belt tension. The second bale carrier 310 also comprises three fixed members 279a, 279b, 279c around which three elongate rollers 280a, 280b, and 280c independently rotate around three rotatable axes, the three rollers 280a, 280b, and 280c being affixed to a pair of parallel bars 281 (only one parallel bar is depicted in side view. The third bale carrier 320 obstructs the outlet 245 of the second bale chamber 244. Similarly, the third bale carrier 320 comprises at least a first pair of arms 282 extending in parallel transversely from and affixed to a first pair of pivot points 283 on the first and second sidewalls (only one arm and one pivot point of the pair is depicted in side view); and a second pair of arms 284 extending in parallel transversely from and affixed to a second pair of pivot points 285 on the first and second sidewalls (only one arm and one pivot point of the pair is depicted in side view). The second bale carrier 310 also comprises three fixed members 286a, 286b, 286c around which three elongate rollers 287a, 287b, and 287c independently rotate around three rotatable axes, the three rollers 287a, 287b, and 287c being affixed to a pair of parallel bars 288 (only one parallel bar is depicted in side view). It should be noted that, in some embodiments, the first and/or second pair of arms of each bale carrier are telescopic are attached to one or a plurality of longitudinal springs that compress and extend to accommodate the growth of the bale in the bale chamber when the bale carriers are in their fully closed positions.

FIGS. 4A-4F depicts the function of the components of an embodiment of the continuous round baler during operation. It is understood that the components of the continuous round baler may function in a serial, stepwise or simultaneous fashion but that all steps described in FIGS. 4A, 4B, 4C, 4D, 4E, and 4F illustrate one embodiment of a single cycle of continuous baling for purposes of the invention. FIG. 4A depicts a bale B1 having just been fully formed in the second bale chamber of the continuous round baler. The second bale carrier L2 is in its fully closed position to support a fully formed bale on its lowermost baling belt roller and accommodate the reduced slack in the baling belts necessary to wrap the top of the bale B1. The two movable baling belt rollers 460 above the second bale chamber are positioned in their aftmost position. The net wrapping device 410, in this embodiment located in the back of the baler adjacent to the floor rolls of the second bale chamber 440, are in operable contact with the second bale chamber and begins a net wrapping of the bale B1. Because the speed of the belts in the first and second bale chambers are independently operated in the first and second serpentine system by using a controller, in some embodiments, the operator can engage the controller to increase the belt speed of the second serpentine system to decrease wrapping time of the formed bale in the second bale chamber. The movement of the conveyor belt in the conveyor system 400 is stopped to prohibit entry of crop on the conveyor system into the second bale chamber during wrapping of the fully formed bale. Simultaneously, the first bale carrier L1 is also placed in its fully closed position in order to block any crop 430 from entering the conveyor system 400. At this point, any crop 430 being harvested begins accumulating as a core in the first bale chamber. Because there is limited amounts of crop in the first bale chamber at this stage of continuous baling, the movable member 450 attached to the two movable lower baling belt rollers is in its lowermost position in order to recoil any slack in the baling belts running along the core at the bottom of the first bale chamber. The bale-kicking mechanism 420 is in its fully rested position forward of the first bale chamber. In some embodiments, the bale-kicking mechanism 420 is mechanically connected to the first bale carrier L1 so that, upon engagement of the first bale carrier in its fully raised position, the bale-kicking mechanism moves in the aft direction and pushes the core out of the first bale chamber. In some embodiments, the bale-kicking mechanism comprises a hydraulic cylinder that moves the bale-kicking mechanism to the aft position upon engagement of the first bale carrier to its fully open position. In some embodiments, the articulated bale-kicking mechanism 420 comprises a main telescopic beam (extended and retracted hydraulically) that allows to push the core deep into the first chamber.

FIG. 4B depicts the series of events that occur sequentially or simultaneously after the steps in FIG. 4A have occurred. In FIG. 4B, the front core of crop 430 has grown to produce a second bale B2 between about 50% to 60% of its maximum size within the first bale chamber. As the bale B2 grows in diameter, the baling belts in the first bale chamber adjust such that slack in the baling belts is provided in the center of the first bale chamber by gradually raising the movable member 450 from its lowermost position. The bale-kicking mechanism 420 remains stationary while the growing bale becomes increasingly proximate to the movable roller on the bale-kicking mechanism 420. The fully formed bale B1 in the second bale chamber becomes completely wrapped in netting while the two movable rollers 460 remain stationary to accommodate the fully formed bale B2. The duckbill of the net wrapping mechanism 410 retracts from the second bale chamber and a lock on the third bale carrier L3 is released. At this stage, the conveyor system 400 remains motionless.

FIG. 4C depicts the series of events that occur sequentially or simultaneously after the steps in FIG. 4B have occurred. FIG. 4C depicts the second bale B2 being at a size equivalent to about 70%-75% of its maximum size. With the size of the second bale B2 being nearly full size, the movable member 450 is raised to its highest position releasing a sufficient length of baling belts to run along a perimeter of the second bale B2. The roller 263 of the bale-kicking mechanism 420 is in operable contact with the second bale B2. The third bale carrier L3 is opened to this highest position allowing for clearance of the first bale B1 out of the second bale chamber and, in this embodiment, onto a field. The two movable rolls 460 move to their forward most position to retract any slack caused by opening the third bale carrier L3. Gravity, in combination with a roll sledge assembly 440 positioned on springs, ejects the bale from the second bale chamber. The conveyor system 400 remains stationary.

FIG. 4D depicts the series of events that occur sequentially or simultaneously after the steps in FIG. 4C have occurred. In FIG. 4D the second bale B2 has reached a size equivalent to about 80%-85% of its maximum size through crop 430 accumulation in the first bale chamber approaching a predetermined height (marked A) that is detected by a sensor positioned within the first bale chamber. The first bale carrier L1 is unlocked and the second bale chamber prepares for receiving the second bale B2. All of the baling belt slack from the two lower baling belts 450 has been released to run over a perimeter of the second bale B2. Preparation for bale transfer occurs by closing the third bale carrier L3 and opening the second bale carrier L2. Slack from the tension release in the baling belts within the second bale chamber is accepted by the expansion of the two movable rollers 460 that remain in their forward most positions. In some embodiments, the second and third bale carriers are linked mechanically for simultaneous operation. In some embodiments, the second and third bale carriers are controlled independently by a controller. In some embodiments, the controller includes one or more switches that is in electronic communication with one or more tensioning actuators that rest on the first pair of arms of each bale carrier.

FIG. 4E depicts the series of events that occur sequentially or simultaneously after the steps in FIG. 4D have occurred. In FIG. 4E the second bale B2 has reached a size equivalent to about 90% of its maximum size through crop 430 accumulation in the first bale chamber and until a predetermined height (marked A) that is detected by a sensor positioned within the first bale chamber. The first bale carrier L1 opens to allow ejection of the bale along the path mark A to A'. Slack in the baling belts of the first bale chamber are retracted by the two lower movable baling belt rollers fixed on the movable member 450. The bale-kicking mechanism 420 is engaged such that its roller moves laterally to the aft direction and pushes the second bale B2 out of the first bale chamber and onto the conveyor system 400. In some embodiments, the bale kicker is controlled mechanically, or optionally, by a hydraulic mechanism. Crop 430 continues to be harvested behind the second bale B2 and onto the conveyor system 400 as the bale B2 moves into the second bale chamber.

FIG. 4F depicts the series of events that occur sequentially or simultaneously after the steps in FIG. 4E have occurred and depending upon the size of the bale. Once the second bale B2 is secured in a rotating state within the second bale chamber, the second bale carrier L2 closes to its fully closed position. In some embodiments, the second bale carrier is spring loaded downward to provide additional force when it is time to wrap the bale. In some embodiments, the first bale carrier triggers a mechanical or electrically powered switch that automatically lowers the second bale carrier.

In some embodiments, the rotating position is determined by a sensor positioned in proximity to the second bale chamber. The movable rollers above the second bale chamber 460 begin to move in the aft direction as the baling belts, operating at normal speed, begin to grow the second bale B2 in the second bale chamber, by crop 430 entering the second bale chamber via the conveyor system 400. The crop 430 can follow the conveyor system due to the first bale carrier L1 still in its fully open position. The bale-kicking mechanism may remain open or closed depending upon operator preference. After completion of bale formation of B2, the cycle of steps may begin again with the events shown in FIG. 4A.

Figure 5:
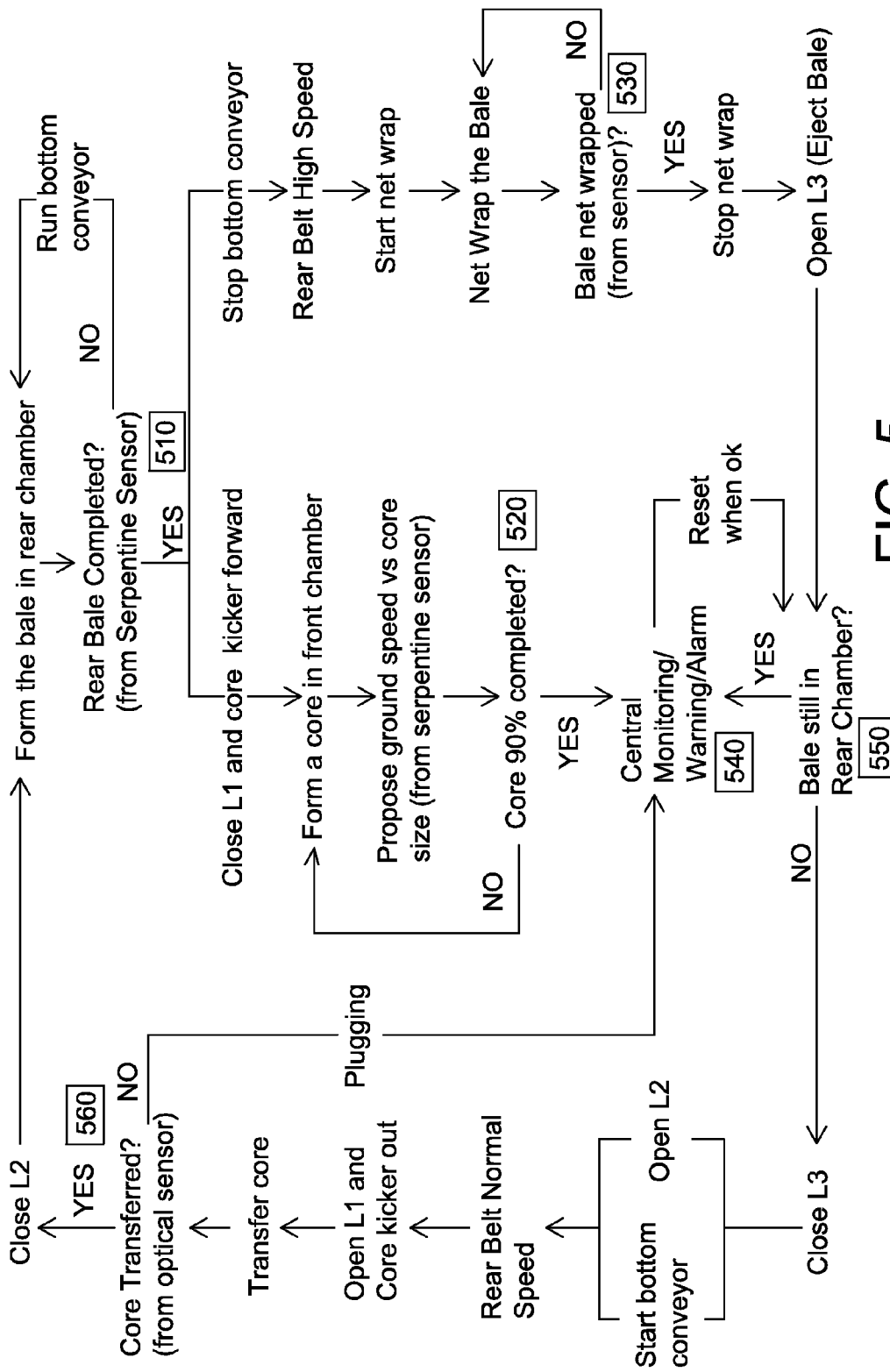
FIG. 5 depicts a flow chart describing the sequential actions and decision tree of the operator during operation of the continuous round baler.

FIG. 5 depicts a decision tree for the operator that corresponds to the steps related to the continuous round baler function above. In some embodiments, the continuous round baler comprises a sensor fixed to a component of the second serpentine system that detects the diameter of the growing bale in the second bale chamber. When the operator receives a signal from the sensor positioned within the second bale chamber that the bale in the second bale chamber is completely formed to its desired size, the operator may engage a controller to close the first bale carrier and stop the bottom conveyor. Engaging the controller in response to the signal of the first sensor 510 initiates a set of steps that simultaneously occur until the operator receives a signal from a second sensor 520 positioned in the first bale chamber and a third sensor 530 positioned in the second bale chamber. The second sensor that is positioned in the first bale chamber monitors the size of the bale growing in the first bale chamber. The third sensor positioned in the second bale chamber determines whether the bale in the second bale chamber has been successfully wrapped by netting or other wrapping material. Until the sensor detects a complete netting around the bale in the second bale chamber, the net wrapping mechanism will continue to deploy wrapping material around the bale on the stubble at a variable rate of speed controlled by the operator. In some embodiments, the controller can change the speed of the belts for the net wrapping. Once fully wrapped, the operator can choose to open the third bale carrier and eject the bale from the second bale chamber. A sensing mechanism that monitors whether the bale is still present in the second bale chamber 550 is in operable communication with a central monitoring system comprising an alarm 540. When the second sensor 520 relays a signal to the operator that the bale in the first bale chamber is 90% complete 520 and a second bale has become ejected from the second bale chamber 550, the operator may close the third bale carrier and initiate the steps necessary to transfer the bale in the first bale chamber from the first bale chamber to the second bale chamber. In some embodiments, a controller initiates the steps necessary to transfer the bale in the first bale chamber from the first bale chamber to the second bale chamber automatically upon complete closure of the third bale carrier. An optical sensor (in some embodiments, a camera) positioned in between the first or second bale chambers 560 may present a signal to the operator that the transfer of the bale to the second bale chamber is complete. As soon as the second bale carrier is triggered by the operator and closes, the operator may monitor the same cycle of events beginning at the step of forming the bale in the second bale chamber.

Figure 6A:
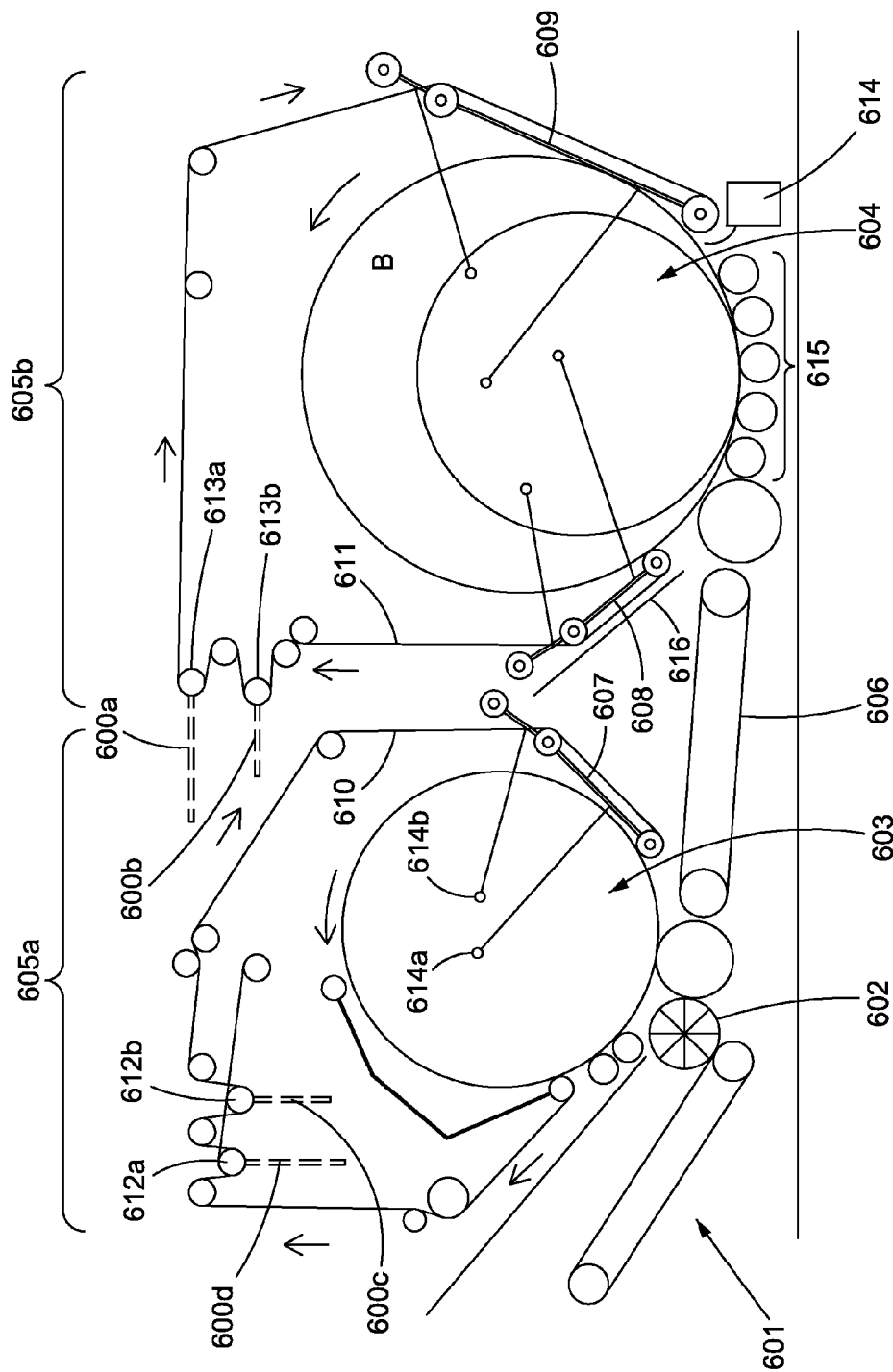
FIG. 6A depicts an exemplary embodiment of a side view of the bale-forming apparatus compatible with a combine.

FIG. 6A describes an alternative embodiment of the invention whereby the continuous bale forming and ejection apparatus is integrated into a self-propelled combine. The figure depicts the alternative embodiment from an exploded cross-sectional side view of the apparatus. This embodiment comprises a first bale chamber 603 and a second bale chamber 604 operably coupled by a conveyor system 606 that carries harvested material from the first bale chamber 603 to the second bale chamber 604 where one or a plurality of baling belts are part of a first serpentine system 605a. Crop material is conveyed by a second conveyer system 601 from the internal section of the combine, positioned forward of the bale forming and ejection apparatus, to an impeller system 602, where crop is chaffed or ground more finely to facilitate entry and packing of the crop material into the first bale chamber 603. Crop material enters the first bale chamber 603, where a bale can be partially formed by movement (depicted by direction of arrows) of one or a plurality of baling belts 610 until it reaches a desired diameter detected by a sensor (not depicted) positioned within the first bale chamber 603. A first bale carrier 607 can be raised at one or more upward angles from its two pivot points 614a, 614b by a pair of tensioning actuators that are mechanically connected to one arm of the bale carrier 607. As the bale grows, the one or plurality of baling belts 610 maintains tension in a first serpentine system 605a by two movable rollers 612a, 612b, which are movable in the up and downward directions, and that move upward thereby releasing slack in the one or plurality of baling belts 610 to accommodate the growing size of the bale. The moveable rollers 612a, 612b can move in the upward and downward direction by their mechanical connection to an opposite pair of slots 600c, 600d (only one pair of slots shown) that are embedded in opposite side walls and guide the roller movement. In some embodiments, the moveable roller movement is independently controlled by the operator. The rollers rotate about axes that are in contact with the vertical slots 600c, 600d.

From its depicted fully closed position of FIG. 6A, the first bale carrier 607 is opened to facilitate movement of the crop on the conveyer system 606 from the first bale chamber 603 to the second bale chamber 604. In its fully closed position, a second bale carrier 608 obstructs the entry point of the second bale chamber. A thin plate 616 is attached to the second bale chamber 608 so that harvested material on the conveyor belt does not jam the movement or rollers of the second bale carrier 608. The second bale carrier 608 is opened from its depicted, fully closed position to allow harvested crop material on the conveyer system 606 to enter the second bale chamber 604 by tensioning actuators mechanically attached to one arm of the second bale carrier 608. A partially formed bale B rotates in the second bale chamber 604 by contact with one or more plurality of baling belts 611 that move in the direction of the depicted arrows. A second serpentine system 605b comprises two moveable rollers, 613a, 613b which are moveable in the fore and aft directions by two pair of slots 600a, 600b (only one pair of the slots shown) that are embedded on each sidewall opposite to one another. Similar to the slots 600c, 600d in the first serpentine system 605a, the two pair of slots 600a, 600b in the second serpentine system 605b allow slack to be taken up in the one or plurality of baling belts 611 as the bale in the second bale chamber 604 grows to its fully formed diameter. Upon reaching a desired diameter detected by a sensor (not depicted) in the second bale chamber 604, a net wrapping device 614 (optionally moveable but positioned to the rear of the second bale chamber when in use) releases net wrapping material to cover the bale before the bale becomes evacuated from the second bale chamber 604. In some embodiments, the speed of the one or plurality of baling belts 611 can be increased by operator through a controller thereby increasing the rate at which the net wrapping material covers the bale. Once the net wrapping material completely wraps the bale, a third bale carrier 609 is raised to a height sufficient for a fully formed bale to exit the bale-forming apparatus by a pair of tensioning actuators that are in mechanical contact with one pair arms on either side of the third bale carrier 609. In some embodiments, evacuation of the bale from the second bale chamber 604 is accomplished by a sledge assembly on the bottom of or in operable connection to the floor rollers 615 that define the bottom of the second bale chamber 604.

Figure 6B:
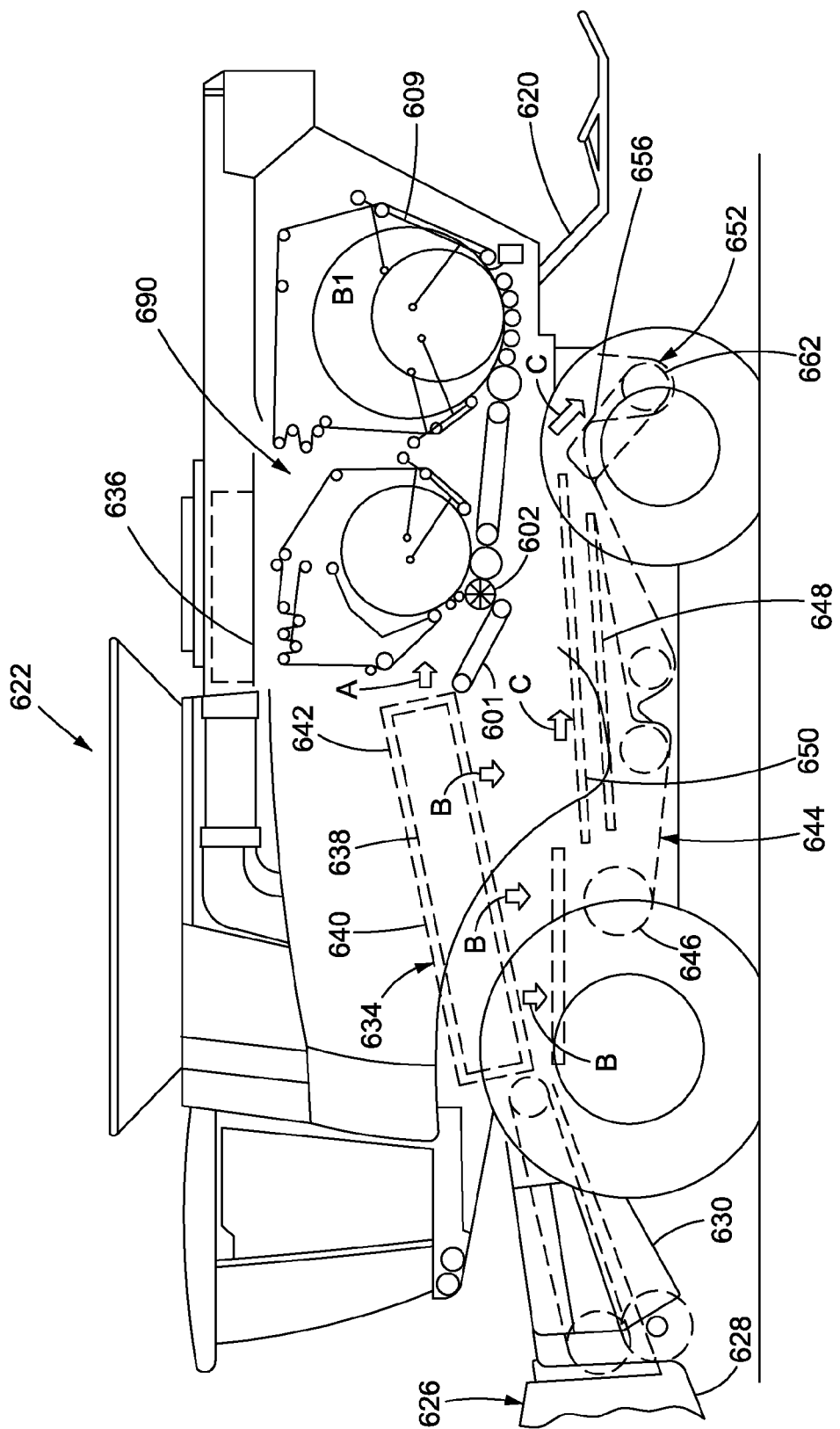
FIG. 6B depicts an exemplary embodiment of the bale-forming and ejection apparatus integrated into an agricultural harvester such as a combine.

FIG. 6B depicts a self-propelled agricultural combine 622, including an on-board round baler 690 operable for compacting crop residue and chaff into large round bales (one of which is depicted as B1) and discharging the bales. In some embodiments, the combine also optionally comprises a dust suppression apparatus, as described in United States Patent Application U.S. 2010/0267432, filed Jan. 5, 2010, which is herein incorporated by reference in its entirety. The combine 622 includes a harvesting apparatus 626 having a crop appropriate, e.g., corn or grain, header 628 constructed and operable in the well-known manner for cutting crops from a field and gathering the cut crops; and a feeder 630 also constructed and operable in the well-known manner for receiving the cut crops, initially compressing them into a continuous mat, and conveying them to a threshing system 634 contained within a housing 636 of the combine 622. The threshing system 634, also constructed and operable in the well-known manner, includes apparatus configured and operable for separating larger elements of crop residue, also referred to generally as straw, and including stalks, cobs, stems, leaves, weeds and other larger plant matter, from the grain and chaff comprising smaller elements of crop residue, e.g., fragments of pods, leaves, cobs, husks, etc. In some embodiments, the threshing system is selected from an axial threshing system, a conventional threshing system, or a hybrid threshing and separation system.

As an example, the threshing system 634 is depicted as a dual rotor system including two side by side generally cylindrical rotors 638 rotatable by a suitable drive apparatus within perforated cylindrical concaves 640, respectively, for conveying the compressed crop mat in a helical manner through an annular gap there between, for threshing grain and smaller elements of crop residue or chaff, from the larger crop residue which will remain in a mat. The larger crop residue, still largely in the form of compressed mats is then discharged from a discharge end 642 of the threshing system 634 as a combined first flow, denoted by arrow A, from discharge ends of rotors 638. Here, the dual rotors 638 are counter-rotating, and discharge their mats in a convergent manner which forms the flow A, although it should be noted that other threshing system configurations can be used with the present invention, to discharge this residue in different manners, e.g., as a single mat, more toward one side of the threshing system or the other, with equal utility for the purposes of the invention. The first flow of crop A is then conveyed by conveyer system 601 and into an impeller system 602, where the crop can be baled, in some embodiments as described above. When the third baler carrier 609 is opened, the bale of harvested crop material B can exit on a bale ramp 620. The operator can optionally choose to regroup the bale in a bale accumulator function if the operator desires to evacuate the bale at a selected position in the field. In some embodiments, the controller can choose to eject the bale from the bale ramp when a second bale is ejected from the third bale carrier. In this way, the operator can choose to eject two bales at once for more efficient collection of the bales in the field. In this regard, it is contemplated that the baler 690 can be incorporated into a wide variety of harvesters, including those with a single rotor threshing system, and those including a separation cylinder or cylinders such as found on newer hybrid combines.

At the same time that first flow A is being discharged in the above-described manner, a second flow, denoted by arrows B, will be discharged from threshing system 634 at a second location, which here, will be through the outer lower peripheries of concaves 640, also in the well-known manner. Second flow B will comprise the grain mixed with the smaller elements of crop residue or chaff. Flow B will fall through an interior cavity of housing 636, onto elements of a cleaning system 644 of the combine.

The cleaning system 644 of the combine 622 separates the chaff, e.g. fragments of seed pods, husks, etc., from the grain, using a rearwardly and upwardly directed flow of air, from a forwardly located fan 646, directed through a lower sieve 648 and an upper sieve 650. Essentially, flow B will fall variously onto upper sieve 650 and a grain pan forwardly thereof, and will be agitated by reciprocating movements of that pan and sieve in the well-known manner. Sieve 650 has openings therethrough sized to allow passage of the grain and similarly sized elements of chaff therethrough, while larger, heavier elements of chaff will be carried rearwardly over the surface thereof, as denoted by arrows C, to a chaff conveyor system 652 of the invention described below, and lighter elements and dust, will be carried rearwardly by the air flow to an inclined chaff pan 656. A trough 662 can optionally have a door or removable bottom or side panel, to allow inspection and cleanout of accumulated crop residue. This door can also be opened to allow the chaff to fall through conveyor 652, either onto the ground or an optional chaff spreader that can be positioned below the conveyor 652.

Figure 7A:
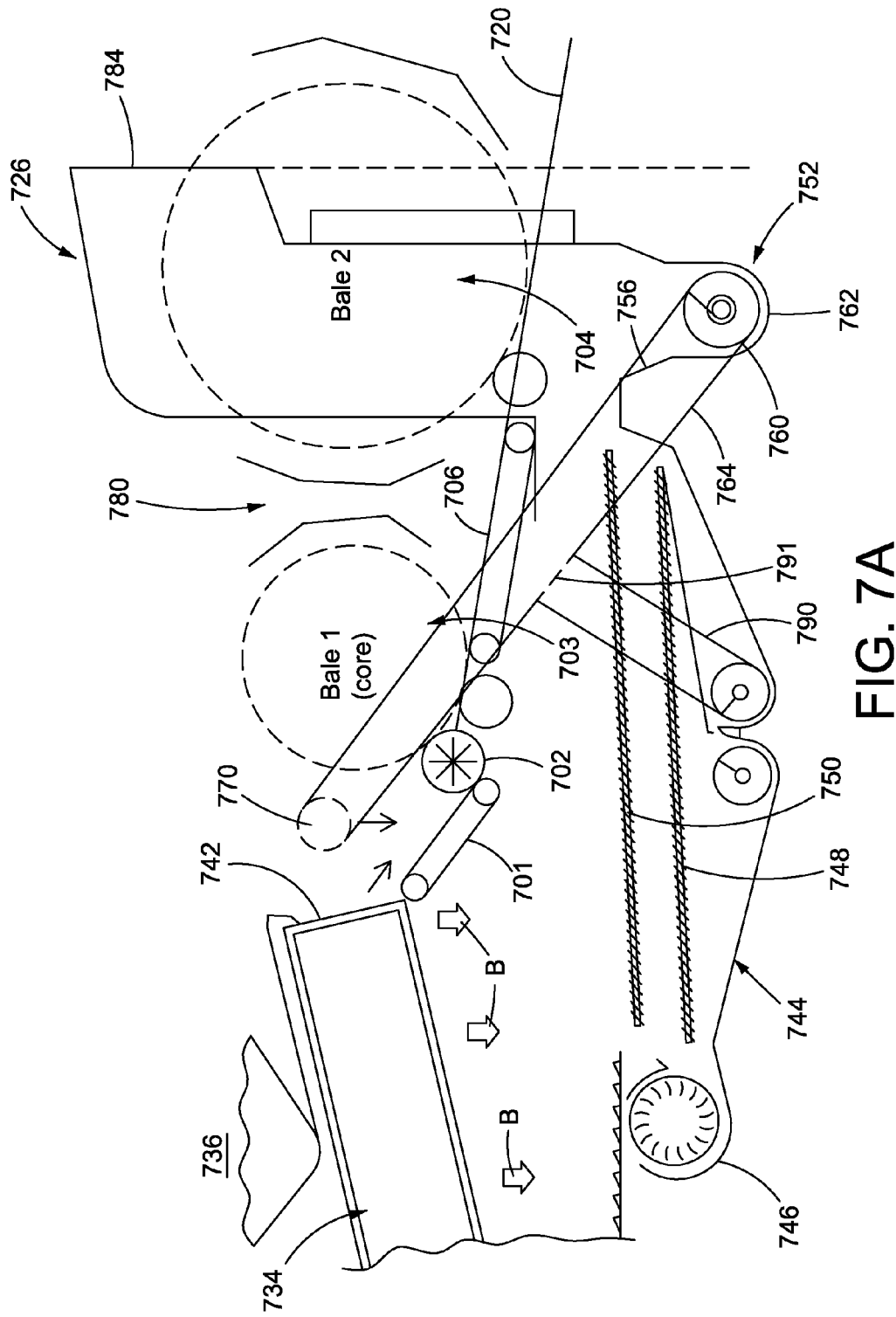
FIG. 7A depicts an exemplary embodiment of the bale-forming and ejection apparatus integrated into a combine at the location where the thrashing system is most proximate to the bale-forming and ejection apparatus.
Figure 7B:
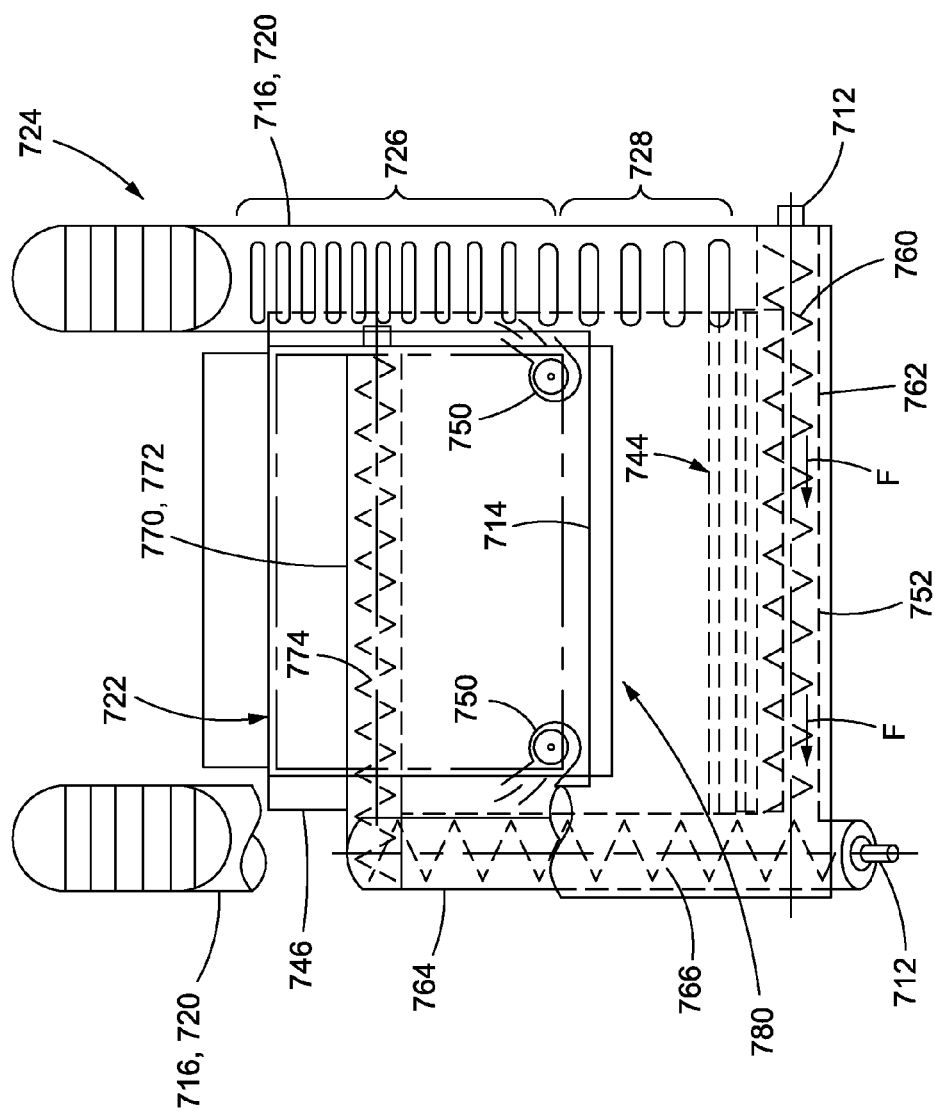
FIG. 7B depicts a rear-view exemplary embodiment of the bale-forming and ejection apparatus integrated into a combine with a dust suppression apparatus.

FIGS. 7A and 7B depict another exemplary embodiment of a self-propelled combine comprising a dust suppression apparatus 726 within the inner combine housing 736. In FIG. 7A, the chaff conveyor system 752 functions in cooperation with bale forming and ejection system 780 and a dust suppression apparatus 726. Crop exits the discharge end 742 of threshing system 734 and onto a second conveyor system 701 (at a downward angle) which draws the harvested crop material into an impeller 702 and into a first bale chamber 703 in conjunction with the bale forming and ejection apparatus 780. The bale forming and ejection apparatus 780 is positioned between a pair of diffusers or ducts 784 (only one duct shown) of the dust suppression system 726. A partially formed bale (Bale 1) positioned can be transferred to a second bale chamber 704 by a first conveyor system 706 positioned at a slightly downward angle in between the first bale chamber 703 and the second bale chamber 704. A fully formed bale (Bale 2) can be ejected out of the bale forming and ejection apparatus 780 and onto a bale ramp 720 that supports the weight of the bale as it exits the second bale chamber 704. Ejection of the fully formed bale (Bale 2) is accomplished between the ducts of the dust suppression system 726. In some embodiments, the bale ramp functions as a crop accumulator to regroup the bales.

Chaff falling from the threshing chamber 734 through movement B onto the cleaning system 744, which is housed in the inner combine chamber 736. The cleaning system 744 separates the chaff, e.g. fragments of seed pods, husks, etc., from the grain, using a rearwardly and upwardly directed flow of air from a forwardly located fan 746, directed through a lower sieve 748 and an upper sieve 750. Essentially, flow B will fall variously onto upper sieve 750 and a grain pan forwardly thereof, and will be agitated by reciprocating movements of that pan and sieve in the well-known manner. The sieve 750 has openings sized to allow passage of the grain and similarly sized elements of chaff. A chaff collection conveyor has a width about equal to that of the sieve 750, and is positioned rearwardly thereof at a lower end of an inclined chaff pan 756, extending rearwardly and downwardly from the rear edge of the sieve 750. This is also advantageous as it places conveyor 752 also below an upwardly extending duct 784 of dust suppression apparatus 726, for collecting any particles of chaff that fall from airborne suspension in that apparatus. The conveyor includes a helical auger 760 supported for rotation in an upwardly open auger trough 762 and operable for conveying chaff therein to one end thereof. Chaff is moved from the bottom of the inner combine chamber 736 frontwardly and upwardly by the a second chaff conveyor 764 which in some embodiments, is a helical auger type conveyor. The second chaff conveyor 764 a helical auger send chaff materials toward the threshing system where material can be transferred to a third crop conveyor 770 which is horizontal and slotted so as to drop material proximal to the bale formation and ejection apparatus 780.

FIG. 7B depicts a rear perspective view of an exemplary embodiment of a self-propelled combine comprising a dust suppression apparatus 726. The chaff conveyor system 752 includes a second chaff conveyor 764 which is also preferably a helical auger type conveyor, including a helical auger supported for rotation within an upwardly and forwardly through the extending tube 766. Alternatively, a bucket or other type of conveyor could be used. The chaff conveyor system 752 comprises a third chaff conveyor 770, which is disposed adjacent to or in a first location, between threshing system and baling formation and ejection apparatus, extending across that location, so as to be operable for conveying the chaff flow F to the crop residue flow, and discharging the chaff generally evenly, or at a more central location, into flow en route to baling formation and ejection apparatus. To facilitate this function, conveyor 770 preferably has a tubular or enclosed housing 772 containing an impeller for moving the chaff therethrough which is a helical auger 774 and drop material into 701 conveyor.

The cleaning system 744 generates and directs flows of air through the cleaning system for separating the chaff and dust from the grain, and which will carry the dust from the cleaning system to dust suppression apparatus 726. Apparatus 726 preferably includes an inlet plenum 714 across the rear end of housing 746 and incorporating inlet passage, configured and positioned for receiving flows of air, and a pair of upwardly extending cyclones or ducts 716 on opposite sides of bale-forming and ejecting apparatus 780, respectively. Ducts 716 extend upwardly to connect with upper ends of downwardly extending ducts 720 in a generally overall U-shape, and a plurality of baffles are disposed at or in the vicinity of this juncture. An optional supplemental blower or blowers can also be provided in connection with the upwardly extending ducts 716, to direct and boost the air and dust flow upwardly therethrough, if desired or required for a particular application, as denoted by blowers 750. Baffles 722 are oriented to extend downwardly at an incline to horizontal in the direction of flows, and are located adjacent to a perforated upstanding wall of the downwardly extending duct 720, for directing or deflecting at least a substantial portion of the particles and dust which reaches or enters the downwardly extending duct, downwardly therethrough, so as to allow the air flow that enters the downwardly extending duct to flow outwardly therefrom and diffuse through perforated upstanding wall. The upward extent of ducts 716 and presence of baffles 722 can also serve to cause the larger particles of chaff and dust to fall out of suspension in the air so as to drop into chaff collection conveyor 752 so as to be baled. In some embodiments, the second chaff conveyor 764 is operably connected to a fourth conveyor 790 via a door 791 which can be opened or closed through a controller at the operator's option. The fourth conveyor 790 may be used to connect chaff flow from or to the tailings system. In some embodiments, the direction of the flow of the chaff through the conveyors 764 and 790 can be directed by the operator.

As a result, the air exiting the dust apparatus 724 is reduced in particle and dust content, and a substantial portion of the dust will fall onto the ground through a lower opening 726 of each duct 720. And as an advantage, effective particulate and dust suppression is achieved, with a passive system that uses existing air flow. Also, better weed control can be achieved, as much of the weed seed will fall into conveyor 774 and baled, as opposed to being discharged onto the ground behind combine. Perforated wall can include a variety of configurations of perforations, such as, but not limited to, a graduated array of progressively larger and closer together openings or holes, which are configured to achieve a low static air pressure and particle velocity in the lower region of duct 720. As a non-limiting example, a first array of smaller slots 726 can be provided in an upper region of wall, and a second array of larger slots 728 can be provided in a lower region, to achieve the desired air diffusion and low pressure particle discharge. As an advantage of dust suppression apparatus 724 of the invention, most of the air flow exiting is mainly clean, including being largely free of weed seeds, so as to provide good weed control. The combine is then more environmentally friendly than current models because it is injecting the chaff into the bale and separates the dust from the air at the outlet and lets the dust settle down in a large venting conduit, e.g., duct 720. Additionally, an optional skirt can be added about the bottom of apparatus, to further keep the dust down. The embodiment of the invention includes typical propulsion means including an engine connected in driving communication with drive wheels in the well-known manner. In some embodiments, the harvesting apparatus 626, threshing system 634, 734 and cleaning system 744 is driven by the engine via a conventional driveline, also in the well-known manner. In some embodiments, conveyors 760, 764 and 770, can be operatively driven by the engine in any suitable manner, such as by using fluid motors 712 (depicted in FIG. 7B), belts, chains, electrical motors or the like.

Having described a series of embodiments, it will become apparent that various modifications can be made without departing from the scope of the invention as defined in the accompanying claims.

What is claimed is:

1. A crop collection system for use in an agricultural harvester comprising:
   a first bale chamber and a second bale chamber operably coupled by a conveyor system; wherein the first bale chamber is positioned at a front of the baler and the second bale chamber is positioned at a rear of the baler, wherein each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls; wherein the conveyor system is positioned between the first and second bale chambers at a downward angle from the front of the baler to the rear of the baler;
   a crop harvesting arrangement positioned in the front of the baler and in operable connection to the first bale chamber; and
   at least one bale carrier, each bale carrier movable among a closed position and one or more open positions, comprising:
      a first pair of arms extending transversely from and affixed to a first pair of pivot points on the first and second sidewalls;
      a second pair of arms extending transversely from and affixed to a second pair of pivot points on the first and second sidewalls;
      one or more fixed members positioned at a distance defined by the length of the first and second pair of arms; and
      a pair of parallel bars affixed to the one or more fixed members.

2. The crop collection system of claim 1, wherein the crop collection system further comprises a fixed member positioned above the at least one bale carrier for feeding or retracting a flexible material attached along a face of the at least one bale carrier distal to the fixed member.

3. The crop collection system of claim 2, wherein the fixed member comprises a spring-loaded roller for feeding or retracting the flexible material.

4. The crop collection system of claim 2, wherein the fixed member is operably coupled to at least one motor for facilitating the feeding or retraction of the flexible material.

5. The crop collection system of claim 1, wherein the agricultural harvester is one of: a round baler, a cotton harvester, a waste baler, and a combine.

6. The crop collection system of claim 1, wherein the one or more fixed members of the at least one bale carrier comprise at least a first roller; wherein the pair of parallel bars are affixed to each end of the first roller on a set of rotatable axes.

7. The crop collection system of claim 1, wherein the one or more fixed members of the at least one bale carrier comprises at least a first roller and a second roller; wherein the pair of parallel bars are affixed to each end of the first roller and the second rollers on a set of rotatable axes.

8. The crop collection system of claim 1, wherein the first pair of arms and/or the second pair of arms of the at least one bale carrier is operably coupled to a hydraulic system for facilitating upward and/or downward movement of the first pair of arms and/or the second pair of arms around the first and second pair of pivot points.

9. The crop collection system of claim 1, wherein the one or more fixed members of the at least one bale carrier comprise at least a first roller, a second roller, a third roller; wherein the pair of parallel bars is affixed to each end of the first roller, the second roller, and the third roller on a set of rotatable axes; and wherein the at least one bale carrier comprises a fourth roller positioned transverse to the first and second side walls and above the first roller and proximate to the top of the first and second sidewalls.

10. The crop collection system of claim 9, wherein the crop collection system further comprises:
   one or more baling belts to convey rotation of a bale in the bale chamber in contact with the fourth roller positioned above the at least one bale carrier that imparts tension to the one or more baling belts;
   wherein the first roller of the at least one bale carrier takes up slack in the one or more baling belts when the at least one bale carrier pivots upward at any angle from its closed position and provides slack in the one or more baling belts when the at least one bale carrier pivots downward from an open position;
   wherein the second roller of the at least one bale carrier deflects contact between the bale and the one or more baling belts; and wherein the third roller of the at least one bale carrier conveys tension to the one or more baling belts whereby it positions the one or more baling belts in operable contact with the bale when the at least one bale carrier is in its closed position.

11. The crop collection system 10, wherein the crop collection system comprises three bale carriers, each bale carrier comprising:
one or more baling belts to convey rotation of a bale in the bale chamber in contact with a roller positioned above the at least one bale carrier that imparts tension to the one or more baling belts;
wherein the first roller of the at least one bale carrier takes up slack in the one or more baling belts when the retractable bale carrier pivots upward at any angle from its closed position and provides slack in the one or more baling belts when the at least one bale carrier pivots downward from an open position;
wherein the second roller of the at least one bale carrier deflects contact between the bale and the one or more baling belts; and
wherein the third roller of the at least one bale carrier conveys tension to the one or more baling belts whereby it positions the one or more baling belts in operable contact with the bale when the at least one bale carrier is in its closed position.

12. A combine comprising the crop collection system of claim 1.

* * * * *